(12) United States Patent
Yan et al.

(10) Patent No.: US 12,335,753 B2
(45) Date of Patent: Jun. 17, 2025

(54) INFORMATION UPDATE METHOD, DEVICE, AND SYSTEM

(71) Applicant: Huawei Technologies Co., Ltd., Shenzhen (CN)

(72) Inventors: Le Yan, Shenzhen (CN); Qinghai Zeng, Shanghai (CN); Hongzhuo Zhang, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 257 days.

(21) Appl. No.: 17/706,311

(22) Filed: Mar. 28, 2022

(65) Prior Publication Data

US 2022/0225128 A1 Jul. 14, 2022

Related U.S. Application Data

(63) Continuation of application No. PCT/CN2019/116394, filed on Nov. 7, 2019.

(30) Foreign Application Priority Data

Sep. 29, 2019 (WO) ................ PCT/CN2019/109225

(51) Int. Cl.
*H04W 24/02* (2009.01)
*H04W 36/00* (2009.01)
(Continued)

(52) U.S. Cl.
CPC ....... *H04W 24/02* (2013.01); *H04W 36/0016* (2013.01); *H04W 36/362* (2023.05); *H04W 48/18* (2013.01); *H04W 36/0072* (2013.01)

(58) Field of Classification Search
CPC ............. H04W 24/02; H04W 36/0016; H04W 36/00835; H04W 48/18; H04W 36/0072; H04W 36/36
See application file for complete search history.

(56) References Cited

U.S. PATENT DOCUMENTS

| 10,880,793 B2 | 12/2020 | Susitaival et al. |
| 10,945,194 B2 | 3/2021 | Lou et al. |

(Continued)

FOREIGN PATENT DOCUMENTS

| CN | 101730160 A | 6/2010 |
| CN | 103139857 A | 6/2013 |

(Continued)

OTHER PUBLICATIONS

3GPP TSG RAN WG3#105, ZTE, "Further Discussion on CHO Preparation with Multiple Candidate Cells in the Same Target Node", R3-193450 (Year: 2019).*

(Continued)

*Primary Examiner* — Ayaz R Sheikh
*Assistant Examiner* — Mang Boi Thawng
(74) *Attorney, Agent, or Firm* — Slater Matsil, LLP

(57) ABSTRACT

This application provide an information update method, and related communications apparatus. In this solution, a first network device determines first information, and sends the first information to a second network device. After receiving the first information, the second network device updates, based on the first information, configuration information corresponding to a first candidate cell to obtain configuration information corresponding to a second candidate cell. The first information is used to update the configuration information corresponding to the first candidate cell to obtain the configuration information corresponding to the second candidate cell, both the first candidate cell and the second candidate cell are managed by the second network device, the first candidate cell includes at least one cell, and the second candidate cell includes at least one cell.

18 Claims, 5 Drawing Sheets

(51) Int. Cl.
*H04W 36/36* (2009.01)
*H04W 48/18* (2009.01)

(56) References Cited

U.S. PATENT DOCUMENTS

| | | | |
|---|---|---|---|
| 11,291,064 B2 | 3/2022 | Wang et al. | |
| 11,412,432 B2 | 8/2022 | Yan et al. | |
| 2013/0170471 A1 | 7/2013 | Nix | |
| 2014/0126545 A1 | 5/2014 | Takashi et al. | |
| 2015/0038148 A1* | 2/2015 | Park | H04W 36/08 455/437 |
| 2016/0150447 A1* | 5/2016 | Quan | H04W 4/06 370/331 |
| 2017/0303180 A1 | 10/2017 | Kapoulas et al. | |
| 2019/0253949 A1* | 8/2019 | Park | H04W 36/14 |
| 2019/0281511 A1 | 9/2019 | Susitaival et al. | |
| 2020/0084683 A1 | 3/2020 | Moosavi et al. | |
| 2020/0154326 A1 | 5/2020 | Deenoo et al. | |
| 2020/0154510 A1* | 5/2020 | Yilmaz | H04W 76/27 |
| 2020/0413308 A1* | 12/2020 | Hwang | H04W 36/00835 |
| 2021/0037431 A1* | 2/2021 | Xie | H04W 36/00698 |
| 2021/0051550 A1* | 2/2021 | Latheef | H04L 41/0816 |
| 2022/0014987 A1* | 1/2022 | Fujishiro | H04W 36/00837 |
| 2022/0070752 A1* | 3/2022 | Kim | H04W 24/08 |
| 2022/0386197 A1* | 12/2022 | Hwang | H04W 36/00835 |
| 2023/0007542 A1* | 1/2023 | Teyeb | H04W 36/0016 |

FOREIGN PATENT DOCUMENTS

| | | |
|---|---|---|
| CN | 107466457 A | 12/2017 |
| CN | 108632926 A | 10/2018 |
| CN | 109150451 A | 1/2019 |
| CN | 109474962 A | 3/2019 |
| CN | 110035464 A | 7/2019 |
| CN | 110099417 A | 8/2019 |
| CN | 110149664 A | 8/2019 |
| CN | 110178407 A | 8/2019 |
| CN | 110226337 A | 9/2019 |
| WO | 2017070946 A1 | 5/2017 |
| WO | 2018077416 A1 | 5/2018 |
| WO | 2018156696 A1 | 8/2018 |
| WO | 2018175721 A1 | 9/2018 |
| WO | 2018203716 A1 | 11/2018 |
| WO | 2019098910 A1 | 5/2019 |
| WO | 2019179350 A1 | 9/2019 |

OTHER PUBLICATIONS

GPP TSG-RAN WG2#105, LG Electronics Inc, "Consideration to Support Conditional HO in NR", R2-1902108 (Year: 2019).*
3GPP TSG RAN WG2 Meeting #105, OPPO, "Conditional handover for NR Mobility Enhancements", R2-1900867 (Year: 2019).*
GPP TSG-RAN WG2 Meeting #105, vivo, "Consideration on the mobility robustness", R2-1900503 (Year: 2019).*
"Further Discussion on CHO Preparartion with Multiple Candidate Cells in the Same Target Node," Agenda Item: 15.3.1, Source: ZTE, Document for: Discussion and Approval, 3GPP TSG RAN WG3#105, R3-193450, XP051761803. Aug. 26-30, 2019, 7 pages.
3GPP TS 38.423 V15.4.0 (Jul. 2019), 3rd Generation Partnership Project; Technical Specification Group Radio Access Network; NG-RAN; Xn application protocol (XnAP)(Release 15), 309 pages.
ZTE, "Further Discussion on Modification of Ongoing Cho", 3GPP TSG RAN WG3#105, R3-193451, Aug. 26-30, 2019 , 7 pages, Ljubljana, Slovenia.
Samsung, "Conditional Handover Cancel and Modification", 3GPP TSG-RAN WG3 #105, R3-194065, Aug. 26-30, 2019, 2 pages, Ljubljana, Slovenia.
Ericsson, "Conditional Handover—HO modification", 3GPP TSG-RAN WG3 #105, R3-194305, Aug. 26-30, 1 page, Ljubljana, Slovenia.
Huawei, HiSilicon, "Considerations on configurations of CHO target cells", 3GPP TSG-RAN WG2 Meeting #107, Aug. 26-30, 2019, R2-1909687, 6 pages, Prague, Czech Republic.
3rd Generation Partnership Project; Technical Specification Group Radio Access Network;NR;Radio Resource Control (RRC) protocol specification(Release 15),3GPP TS 38.331 V15.7.0 (Sep. 2019),total:527pages.

* cited by examiner

INFORMATION UPDATE METHOD, DEVICE, AND SYSTEM

CROSS-REFERENCE TO RELATED APPLICATIONS

This application is a continuation of International Patent Application No. PCT/CN2019/116394, filed on Nov. 7, 2019, which claims priority to International Patent Application No. PCT/CN2019/109225, filed on Sep. 29, 2019. The disclosures of the aforementioned applications are hereby incorporated by reference in their entireties.

TECHNICAL FIELD

This application relates to the field of communication technologies, and in particular, to an information update method, a device, and a system.

BACKGROUND

In a mobile communication system, a conditional handover (CHO) mechanism can be used to improve a handover success rate. In the CHO mechanism, a source network device sends conditional handover configuration information to a terminal device when quality of a source link is good, and the conditional handover configuration information includes a handover execution condition and configuration information of one or more candidate cells. After receiving the conditional handover configuration information, the terminal device determines, based on the conditional handover configuration information, whether each candidate cell meets the handover execution condition, and uses a candidate cell meeting the handover execution condition as a target cell, to implement handover to the target cell.

In the CHO mechanism, the source network device may maintain a radio resource control (RRC) connection or data transmission with the terminal device until the terminal device is successfully handed over to the target cell. Before the terminal device is successfully handed over to the target cell, for example, before the terminal device determines the target cell, or before the terminal device determines the target cell but has not successfully accessed the target cell, the source network device and the terminal device may update the conditional handover configuration information. For example, the source network device may send a message to the terminal device to update the conditional handover configuration information previously sent to the terminal device, for example, modifying or releasing configuration information of a candidate cell included in the conditional handover configuration information previously sent to the terminal device, or adding a new candidate cell.

However, the update of the conditional handover configuration information by the source network device and the terminal device may be caused by update of configuration information performed on a network device side (that is, performed by the source network device and a candidate network device that manages the candidate cell). Therefore, how to update the configuration information on the network device side is an urgent problem to be resolved currently.

SUMMARY

Embodiments of this application provide an information update method, a device, and a system, so that a network device side can update configuration information corresponding to a candidate cell. According to updating configuration information corresponding to a candidate cell in a timely and proper manner, flexibility and reliability of a conditional handover mechanism are thereby improved.

To achieve the foregoing objective, the following technical solutions are used in embodiments of this application.

According to a first aspect, an information update method and a corresponding communication apparatus are provided. In this solution, a second network device receives first information from a first network device, and updates, based on the first information, configuration information corresponding to a first candidate cell. Both the first candidate cell and a second candidate cell are managed by the second network device, the first candidate cell includes at least one cell, and the second candidate cell includes at least one cell. Based on this solution, the second network device may update, based on the first information sent by the first network device, the configuration information corresponding to the first candidate cell. Therefore, a network device side can update configuration information corresponding to a candidate cell. According to updating configuration information corresponding to a candidate cell in a timely and proper manner, flexibility and reliability of a conditional handover mechanism are thereby improved.

In a possible design, the information update method further includes: The second network device sends, to the first network device, configuration information corresponding to the second candidate cell or information used to update the configuration information corresponding to the first candidate cell. Based on this solution, because the second network device may send, to the first network device, the configuration information corresponding to the second candidate cell or the information used to update the configuration information corresponding to the first candidate cell, the first network device may learn of updated configuration information corresponding to a candidate cell, to notify the terminal device of the updated candidate cell.

In a possible design, the first information is used to indicate first configuration information corresponding to a source cell, the first configuration information corresponding to the source cell is obtained by updating second configuration information corresponding to the source cell, and the source cell is managed by the first network device.

In a possible design, the first information includes the first configuration information corresponding to the source cell. That the second network device updates, based on the first information, configuration information corresponding to a first candidate cell includes: The second network device updates, based on the first configuration information corresponding to the source cell, the configuration information corresponding to the first candidate cell.

In a possible design, the first information includes information used to update the second configuration information corresponding to the source cell. That the second network device updates, based on the first information, configuration information corresponding to a first candidate cell includes: The second network device updates, based on the information used to update the second configuration information corresponding to the source cell, the second configuration information corresponding to the source cell, to obtain the first configuration information corresponding to the source cell; and the second network device updates, based on the first configuration information corresponding to the source cell, the configuration information corresponding to the first candidate cell.

In a possible design, the first information is used to indicate that second configuration information corresponding to a source cell is not updated, and the source cell is managed by a first network device. That the second network device updates, based on the first information, configuration information corresponding to a first candidate cell includes: The second network device updates, based on the second configuration information corresponding to the source cell, the configuration information corresponding to the first candidate cell.

In a possible design, before the first information is received from the first network device, the information update method further includes: The second network device sends second information to the first network device, where the second information is used to request configuration information corresponding to the source cell at a current moment, and the source cell is managed by the first network device.

In a possible design, before the first information is received from the first network device, the information update method further includes: The second network device receives third information from the first network device, and releases, based on the third information, configuration information corresponding to the at least one cell of the first candidate cell.

In a possible design, the first information includes the configuration information corresponding to the second candidate cell or information used to update the configuration information corresponding to the first candidate cell.

In a possible design, that the second network device updates the configuration information corresponding to the first candidate cell includes: The second network device modifies configuration information corresponding to a first cell, releases configuration information corresponding to a second cell, or adds configuration information corresponding to a third cell, where the first cell is at least one cell in the first candidate cell, the second cell is at least one cell in the first candidate cell, the third cell is at least one cell in the second candidate cell, and the third cell is not included in the first candidate cell.

In a possible design, the configuration information includes one or more of the following: a cell radio network temporary identifier C-RNTI, measurement configuration information, bearer configuration information, physical layer configuration information, media access control MAC layer configuration information, radio link control RLC layer configuration information, packet data convergence protocol PDCP layer configuration information, service data adaptation protocol SDAP layer configuration information, or radio resource configuration information.

According to a second aspect, an information update method and a corresponding communication apparatus are provided. In this solution, a first network device determines first information, and sends the first information to a second network device, where the first information is used to update configuration information corresponding to a first candidate cell to obtain configuration information corresponding to a second candidate cell, both the first candidate cell and the second candidate cell are managed by the second network device, the first candidate cell includes at least one cell, and the second candidate cell includes at least one cell. For technical effects brought by the second aspect, refer to the technical effects brought by the first aspect. Details are not described herein again.

In a possible design, the information update method further includes: The first network device receives, from the second network device, the configuration information corresponding to the second candidate cell or information used to update the configuration information corresponding to the first candidate cell. Based on this solution, because the first network device may receive, from the second network device, the configuration information corresponding to the second candidate cell or the information used to update the configuration information corresponding to the first candidate cell, the first network device may learn of updated configuration information corresponding to a candidate cell, to notify the terminal device of the updated candidate cell.

In a possible design, the first information is used to indicate first configuration information corresponding to a source cell, the first configuration information corresponding to the source cell is obtained by updating second configuration information corresponding to the source cell, and the source cell is managed by the first network device.

In a possible design, the first information includes the first configuration information corresponding to the source cell.

In a possible design, the first information includes information used to update the second configuration information corresponding to the source cell.

In a possible design, the first information is used to indicate that second configuration information corresponding to a source cell is not updated, and the source cell is managed by a first network device.

In a possible design, before the first network device sends the first information to the second network device, the information update method further includes: receiving second information from the second network device, where the second information is used to request configuration information corresponding to the source cell at a current moment, and the source cell is managed by the first network device.

In a possible design, before the first network device sends the first information to the second network device, the information update method further includes: sending third information to the second network device, where the third information is used to indicate to release configuration information corresponding to the at least one cell in the first candidate cell.

In a possible design, the first information includes the configuration information corresponding to the second candidate cell or information used to update the configuration information corresponding to the first candidate cell.

In a possible design, the information update method further includes: The first network device sends, to a terminal device, the configuration information corresponding to the second candidate cell or the information used to update the configuration information corresponding to the first candidate cell. Based on this solution, configuration information corresponding to a candidate cell that is updated on the network device side may be sent to the terminal device in a timely manner, so that the terminal device can update configuration information corresponding to a candidate cell in a timely manner.

In a possible design, before the first network device sends, to the terminal device, the configuration information corresponding to the second candidate cell, the information update method further includes: The first network device updates, based on the information used to update the configuration information corresponding to the first candidate cell, the configuration information corresponding to the first candidate cell to obtain the configuration information corresponding to the second candidate cell.

It may be understood that, in the first aspect or the second aspect, that the configuration information corresponding to the first candidate cell is updated based on the first information to obtain the configuration information corresponding to the second candidate cell may also be understood as:

A candidate cell is reconfigured based on the first information to obtain the configuration information corresponding to the second candidate cell.

Correspondingly, "updating the configuration information corresponding to the first candidate cell" may also be replaced with "reconfiguring a candidate cell"; "information used to update the configuration information corresponding to the first candidate cell" may be replaced with "information used to reconfigure a candidate cell"; and "used to update the configuration information corresponding to the first candidate cell" may be replaced with "used to reconfigure the candidate cell".

According to a third aspect, a communication apparatus is provided, to implement the foregoing methods. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided, and includes a memory and at least one processor. The memory is configured to store computer instructions. When the processor executes the instructions, the communication apparatus is enabled to perform the method according to either of the foregoing aspects. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device.

According to a fifth aspect, a communication apparatus is provided, including an interface circuit and at least one processor. The interface circuit may be a code/data read/write interface circuit, and the interface circuit is configured to: receive computer-executable instructions (where the computer-executable instructions are stored in a memory, and may be directly read from the memory, or may be read via another component), and transmit the computer-executable instructions to the processor. The processor is configured to run the computer-executable instructions to perform the method according to either of the foregoing aspects. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device.

According to a sixth aspect, a communication apparatus is provided, and includes a processor. The processor is coupled to a memory, and is configured to perform, after reading instructions in the memory, the method according to either of the foregoing aspects according to the instructions. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device.

According to a seventh aspect, a computer-readable storage medium is provided. The computer-readable storage medium stores instructions. When the instructions are executed on a communication apparatus, the communication apparatus is enabled to perform the method according to either of the foregoing aspects. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device.

According to an eighth aspect, a computer program product including instructions is provided. When the computer program product runs on a communication apparatus, the communication apparatus is enabled to perform the method according to either of the foregoing aspects. The communication apparatus may be the second network device in the first aspect, an apparatus including the second network device, or an apparatus included in the second network device, such as a chip. Alternatively, the communication apparatus may be the first network device in the second aspect, an apparatus including the first network device, or an apparatus included in the first network device.

According to a ninth aspect, a communication apparatus (where for example, the communication apparatus may be a chip or a chip system) is provided. The communication apparatus includes at least one processor, configured to implement a function in either of the foregoing aspects. In a possible design, the communication apparatus further includes a memory. The memory is configured to store necessary program instructions and/or data. When the communication apparatus is a chip system, the communication apparatus may include a chip, or may include a chip and another discrete component.

For technical effects brought by any one of the designs of the third aspect to the ninth aspect, refer to technical effects brought by different designs of the first aspect or the second aspect. Details are not described herein again.

According to a tenth aspect, a communication system is provided. The communication system includes the first network device and the second network device in the foregoing aspects.

DETAILED DESCRIPTION OF ILLUSTRATIVE EMBODIMENTS

Figure 1:
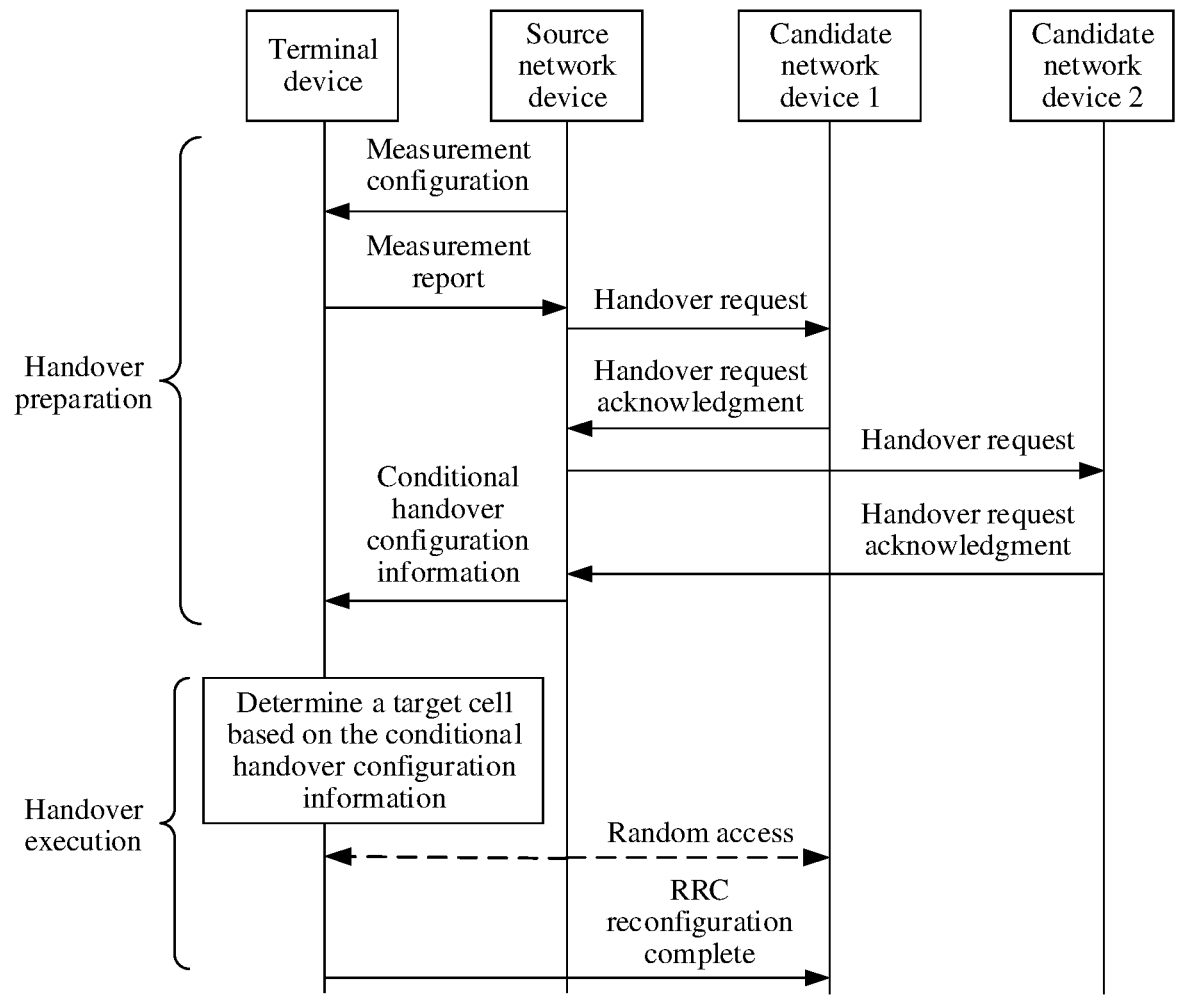
FIG. 1 is a schematic diagram of a conditional handover procedure in a conventional technology.

For ease of understanding of technical solutions in embodiments of this application, the following first briefly describes technologies related to this application.
1. Conditional Handover (CHO) Procedure In this application, a procedure shown in FIG. 1 is used as an example to briefly describe the CHO procedure. The CHO procedure may be divided into a handover preparation procedure (or referred to as a CHO preparation procedure) and a handover execution procedure (or referred to as a CHO execution procedure). It should be understood that FIG. 1 shows steps or operations of the CHO procedure, but the steps or operations are merely examples. In an actual implementation, other operations or variations of the operations in FIG. 1 may be further performed. In addition, the steps in FIG. 1 may be performed in a sequence different from that presented in FIG. 1, and possibly not all of the steps in FIG. 1 need to be performed.

In the handover preparation procedure, a source network device may first send measurement configuration information to a terminal device. After receiving the measurement configuration information, the terminal device performs measurement based on the measurement configuration information, and sends a measurement report to the source network device. After receiving the measurement report, the source network device determines candidate cells based on the measurement report. Herein, it is assumed that the candidate cells determined by the source network device are a candidate cell 1 and a candidate cell 2, the candidate cell 1 is managed by a candidate network device 1, and the candidate cell 2 is managed by a candidate network device 2. After determining the candidate cell 1 and the candidate cell 2, the source network device separately sends a handover request message to the candidate network device 1 and the candidate network device 2. The handover request message is used by the candidate network device 1 and the candidate network device 2 to perform handover preparation for CHO. The candidate network device 1 and the candidate network device 2 perform handover preparation based on the handover request message sent by the source network device, and each send a handover request acknowledgment message to the source network device, to notify the source network device that the handover preparation is completed.

After the handover preparation on the network device side is completed, the source network device sends conditional handover configuration information to the terminal device. The source network device may add the conditional handover configuration information to an RRC message and send the RRC message to the terminal device. The RRC message may be a newly defined message, or may be an existing RRC message, for example, an RRC reconfiguration message carrying a synchronization reconfiguration information element (reconfiguration with sync), or an RRC connection reconfiguration message carrying a mobility control information information element (mobility control info). This is not limited in embodiments. The source network device may send the conditional handover configuration information to the terminal device when signal quality of a source link is good.

The conditional handover configuration information may include a conditional handover trigger condition (or execution condition) and related information corresponding to one or more candidate cells (for example, configuration information corresponding to a candidate cell).

The conditional handover trigger condition (or execution condition) may include a CHO execution event type and a corresponding threshold. The CHO execution event type may include, for example, an event A3, an event A4, an event A5, an event B1, an event B2, or another execution event type. One or more conditional handover execution conditions may be configured for one candidate cell. For example, one execution event type may be configured for one candidate cell, but at least two different thresholds are configured for the candidate cell. Alternatively, at least two different execution event types and thresholds corresponding to the execution event types may be configured for one candidate cell. Conditional handover trigger conditions (or execution conditions) corresponding to different candidate cells may be the same or different. For example, CHO execution event types and/or thresholds corresponding to the execution event types corresponding to different candidate cells may be the same or may be different. This is not limited in embodiments.

The related information of the candidate cell may include one or more of the following: cell identity information (for example, a PCI and frequency information corresponding to the cell, and/or a cell global identifier (CGI), where for example, the PCI and the frequency information corresponding to the cell may be used as the cell identity information, or the CGI may be used as the cell identity information) corresponding to the candidate cell, a cell radio network temporary identifier (C-RNTI) allocated by the candidate cell to the terminal device, and random access channel (RACH) resource information associated with the candidate cell. For example, the random access channel RACH resource information may include dedicated random access resource information and/or common random access resource information. The dedicated random access resource information and the common random access resource information are used to indicate a dedicated random access resource and a common random access resource respectively.

The dedicated random access resource includes a preamble index and a first time-frequency resource, and the common random access resource includes a second time-frequency resource. The frequency information includes one or more of the following: an absolute frequency (for example, absoluteFrequencySSB) of a synchronization signal block SSB, an absolute frequency location (for example, absoluteFrequencyPointA) of a reference resource block (common RB0), a frequency bandwidth list (frequencyBandList), a subcarrier spacing (SCS), and an SCS-specific carrier list (scs-SpecificCarrierList).

Optionally, the related information of the candidate cell may further include a physical layer configuration parameter, a media access control (MAC) layer configuration parameter, a radio link control (RLC) layer configuration parameter, a packet data convergence protocol (PDCP) layer configuration parameter, a service data adaptation protocol SDAP) layer configuration parameter, an RRC layer configuration parameter, and the like that correspond to the candidate cell.

In the handover execution procedure, after receiving the conditional handover configuration information, the terminal device determines, based on the conditional handover configuration information, whether a candidate cell meets the handover trigger/execution condition, and uses a candidate cell that meets the handover trigger/execution condition as a target cell.

For example, in the conditional handover configuration information, for a candidate cell A, a configured CHO execution event type is an event A3, and a configured corresponding threshold is a first threshold. In this case, when cell signal quality (for example, at least one of reference signal received power (RSRP), reference signal received quality (RSRQ), or a signal to interference plus noise ratio (SINR) of the cell) of the candidate cell A is greater than the first threshold, it may be considered that the candidate cell A meets the handover execution condition, and the candidate cell A may be determined as the target cell.

Alternatively, for example, in the conditional handover configuration information, for a candidate cell B, a configured CHO execution event type is an event A3, and configured corresponding thresholds are a second threshold and a third threshold. When cell signal quality of the candidate cell B is greater than the second threshold, and cell signal quality of a serving cell is less than the third threshold, it may be considered that the candidate cell B meets the handover trigger/execution condition, and the candidate cell B may be determined as the target cell.

After determining the target cell from the one or more candidate cells, the terminal device attempts to hand over to the target cell. When successfully accessing the target cell (where for example, the terminal device performs a random access procedure with the target cell, and when the random access is successfully completed), the terminal device sends an RRC message (for example, an RRC reconfiguration complete message) to a network device (namely, a target network device, where the candidate network device 1 in FIG. 1 is used as an example) that manages the target cell, to notify the target network device that the conditional handover is completed. The random access procedure may be skipped and not executed. To be specific, after determining the target cell, the terminal device may directly send the RRC reconfiguration complete message to the target network device.

The following describes the technical solutions in embodiments of this application with reference to the accompanying drawings in embodiments of this application. In descriptions of this application, unless otherwise specified, "/" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists, where A or B may be singular or plural. In addition, in the descriptions of this application, "a plurality of" means two or more, unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items whose functions and purposes are basically the same. A person skilled in the art may understand that the terms such as "first" and "second" do not limit a quantity or an execution sequence, and that the terms such as "first" and "second" do not indicate a definite difference.

The technical solutions in embodiments of this application may be applied to various communication systems, such as an orthogonal frequency division multiple access (OFDMA) system, a single carrier frequency division multiple access (single carrier FDMA, SC-FDMA) system, an NTN system, and other systems. Terms "system" and "network" may be interchanged with each other. The OFDMA system may implement wireless technologies such as evolved universal terrestrial radio access (E-UTRA) and ultra mobile broadband (UMB). The E-UTRA is an evolved version of a universal mobile telecommunications system (UMTS). The 3rd generation partnership project (3GPP) uses a new version of E-UTRA in long term evolution (LTE) and various versions based on LTE evolution. A 5th generation (5G) communication system is a next-generation communication system under study. The 5G communication system includes a 5G mobile communication system in non-standalone (NSA for short) networking, a 5G mobile communication system in standalone (SA) networking, or a 5G mobile communication system in NSA networking and a 5G mobile communication system in SA networking. In addition, the communication systems may be further applied to a future-oriented communication technology, and are all applicable to the technical solutions provided in embodiments of this application. The foregoing communication systems applicable to this application are merely examples for description, and communication systems applicable to this application are not limited thereto. A general description is provided herein, and details are not described below.

Figure 2:
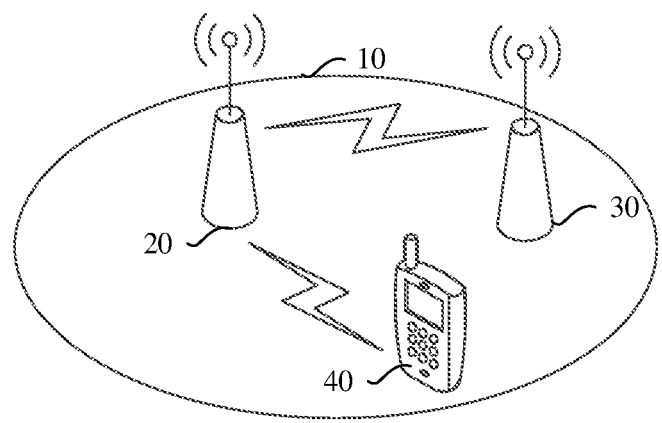
FIG. 2 is a schematic diagram of a communication system according to an embodiment of this application.

FIG. 2 shows a communication system 10 according to an embodiment of this application. The communication system 10 includes a first network device 20 and a second network device 30. Optionally, the communication system 10 may further include a terminal device 40. The first network device 20 and the second network device 30 may communicate with each other, and both the first network device 20 and the second network device 30 may provide a service for the terminal device 40. In this embodiment of this application, an example in which the first network device 20 provides a service for the terminal device 40 is used for description.

Interaction between the first network device and the second network device shown in FIG. 2 is used as an example. In this embodiment of this application, the first network device 20 determines first information, and sends the first information to the second network device 30. The second network device 30 receives the first information from the first network device 20, and updates, based on the first information, configuration information corresponding to a first candidate cell to obtain configuration information corresponding to a second candidate cell. Both the first candidate cell and the second candidate cell are managed by the second network device 30, the first candidate cell includes at least one cell, and the second candidate cell includes at least one cell. Based on this solution, the second network device may update, based on the first information sent by the first network device, the configuration information corresponding to the first candidate cell. Therefore, a network side can update configuration information corresponding to a candidate cell. According to updating configuration information corresponding to a candidate cell in a timely and proper manner, flexibility and reliability of a conditional handover mechanism are thereby improved.

Figure 3:
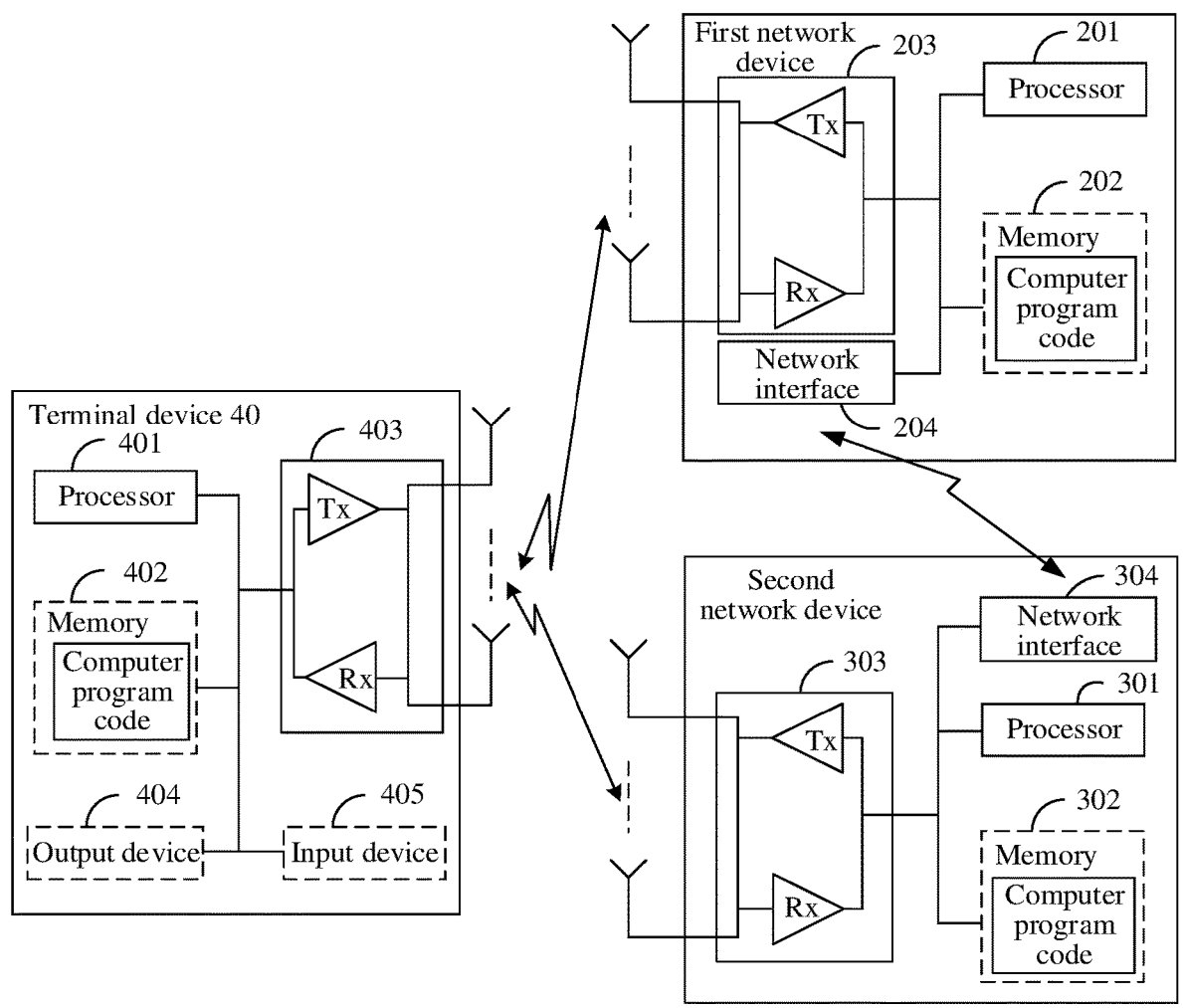
FIG. 3 is a schematic diagram of structures of a terminal device and a network device according to an embodiment of this application.

Optionally, FIG. 3 is a schematic diagram of structures of a first network device, a second network device, and a terminal device according to an embodiment of this application.

The terminal device includes at least one processor (an example in which one processor 401 is included is used for description in FIG. 3) and at least one transceiver (an example in which one transceiver 403 is included is used for description in FIG. 3). Optionally, the terminal device may further include at least one memory (an example in which one memory 402 is included is used for description in FIG. 3), at least one output device (an example in which one output device 404 is included is used for description in FIG. 3), and at least one input device (an example in which one input device 405 is included is used for description in FIG. 3).

The processor 401, the memory 402, and the transceiver 403 are connected through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. During specific implementation, in an embodiment, the processor 401 may also include a plurality of CPUs, and the processor 401 may be a single-core (single-CPU) processor or a multi-core (multi-CPU) processor. The processor herein may be one or more devices, circuits, and/or processing cores configured to process data (for example, computer program instructions).

The memory 402 may be an apparatus having a storage function. For example, the memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of instructions or a data structure and that can be accessed by a computer. However, this is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the information update method according to embodiments of this application. Optionally, the computer-executable instructions in this embodiment of this application may also be referred to as application program code or computer program code. This is not specifically limited in this embodiment of this application.

The transceiver 403 may use any apparatus such as a transceiver, and is configured to communicate with another device or a communication network such as the Ethernet, a radio access network (RAN), or a wireless local area network (WLAN). The transceiver 403 includes a transmitter (Tx) and a receiver (Rx). The transceiver may also be an input/output interface.

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The first network device includes one or more processors (an example in which one processor 201 is included is used for description in FIG. 3), at least one transceiver (an example in which one transceiver 203 is included is used for description in FIG. 3), and at least one network interface (an example in which one network interface 204 is included is used for description in FIG. 3). Optionally, the first network device may further include at least one memory (an example in which one memory 202 is included is used for description in FIG. 3). The processor 201, the memory 202, the transceiver 203, and the network interface 204 are connected through a communication line. The network interface 204 is configured to connect to a core network device through a link (such as an S1 interface) (where the connection is not shown in FIG. 3), or connect to a network interface of another network device through a wired or wireless link (such as an X2 interface). This is not specifically limited in this embodiment of this application. In addition, for the related description of the processor 201, the memory 202, and the transceiver 203, refer to the description of the processor 401, the memory 402, and the transceiver 403 of the terminal device, and details are not repeated herein.

The second network device includes one or more processors (an example in which one processor 301 is included is used for description in FIG. 3), at least one transceiver (an example in which one transceiver 303 is included is used for description in FIG. 3), and at least one network interface (an example in which one network interface 304 is included is used for description in FIG. 3). Optionally, the second network device may further include at least one memory (an example in which one memory 302 is included is used for description in FIG. 3). The processor 301, the memory 302, the transceiver 303, and the network interface 304 are connected through a communication line. The network interface 304 is configured to connect to a core network device through a link (such as an $S_1$ interface) (where the connection is not shown in FIG. 3), or connect to a network interface of another network device through a wired or wireless link (such as an X2 interface). This is not specifically limited in this embodiment of this application. In addition, for the related description of the processor 301, the memory 302, and the transceiver 303, refer to the description of the processor 401, the memory 402, and the transceiver 403 of the terminal device, and details are not repeated herein.

Optionally, a network device (including the first network device 20 and the second network device 30) in embodiments of this application is a device for connecting the terminal device 40 to a wireless network, and may be an evolved NodeB (eNB or eNodeB) in LTE, a base station in a 5G network or a future evolved public land mobile network (PLMN), a broadband network gateway (BNG), an aggregation switch, or a non-3rd generation partnership project (3GPP) access device, a satellite in an NTN-based radio access network (RAN), or the like. This is not specifically limited in embodiments of this application. Optionally, the base station in embodiments of this application may include various forms of base stations, for example, a macro base station, a micro base station (also referred to as a small cell), a relay station, an access point, a next-generation NodeB (gNodeB, gNB), a home base station (for example, a home evolved NodeB or a home NodeB, HNB), a baseband unit (BBU), a transmission reception point (transmitting and receiving point, TRP), a transmission point (transmitting point, TP), and a mobile switching center. This is not specifically limited in embodiments of this application.

In a possible implementation, the network device in embodiments of this application may alternatively be a centralized unit (central unit, CU) or a distributed unit (DU), or the network device may include a CU and a DU. The CU and the DU may be understood as division of a base station from a perspective of logical functions. The CU and the DU may be physically separated, or may be deployed together. This is not specifically limited in embodiments of this application. The CU and the DU may be connected through an interface, for example, an F1 interface. The CU and the DU may be obtained through division based on protocol layers of a wireless network. For example, functions of an RRC protocol layer, an SDAP protocol layer, and a PDCP protocol layer are configured in the CU, and functions of an RLC protocol layer, a MAC protocol layer, a physical (PHY) protocol layer, and the like are configured in the DU. It may be understood that, division into processing functions of the CU and the DU based on the protocol layers is merely an example, and the processing functions of the CU and the DU may alternatively be divided in another manner. This is not specifically limited in embodiments of this application.

Optionally, the CU may include a CU control plane (CU-CP) and a CU user plane (CU-UP). It may be understood that the CU is divided into the CU-CP and the CU-UP by logical function. The CU-CP and the CU-UP may be divided based on a protocol layer of a wireless network. For example, functions of the RRC protocol layer and a PDCP protocol layer corresponding to a signaling radio bearer (SRB) are configured in the CU-CP, and functions of a PDCP protocol layer corresponding to a data radio bearer (DRB) are configured in the CU-UP. In addition, the function of the SDAP protocol layer may also be configured in the CU-UP.

Optionally, the terminal device 40 in this embodiment of this application may be a device, such as a terminal or a chip that may be used in the terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

With reference to the accompanying drawings, the following describes in detail the information update method provided in embodiments of this application by using interaction between the first network device 20 and the second network device 30 shown in FIG. 2 as an example.

It should be noted that names of messages between network elements, names of parameters in the messages, or the like in the following embodiments of this application are merely examples, and there may be other names in a specific implementation. This is not specifically limited in embodiments of this application.

It should be noted that in embodiments of this application, "configuration information change" may also be understood as "configuration information update", and the two may be replaced with each other. "Update configuration information corresponding to a cell" may also be understood as "update a cell", and the two may be replaced with each other. This is not specifically limited in embodiments of this application.

It should be noted that, in embodiments of this application, delta configuration information may be understood as a changed part of configuration information obtained through a current update relative to configuration information obtained through the last update (namely, latest configuration information before the current update), and full configuration information may be understood as configuration information obtained through the current update.

It should be noted that, in embodiments of this application, similar descriptions of a message 1, a message 2, a message 3, a message 4, a message 5, or the like are merely a representative of a message or an example of a message name, and do not specifically refer to a message with a special meaning (for example, an MSG 1/2/3/4 in a random access procedure). A general description is provided herein, and details are not described in the following embodiments.

Figure 4:
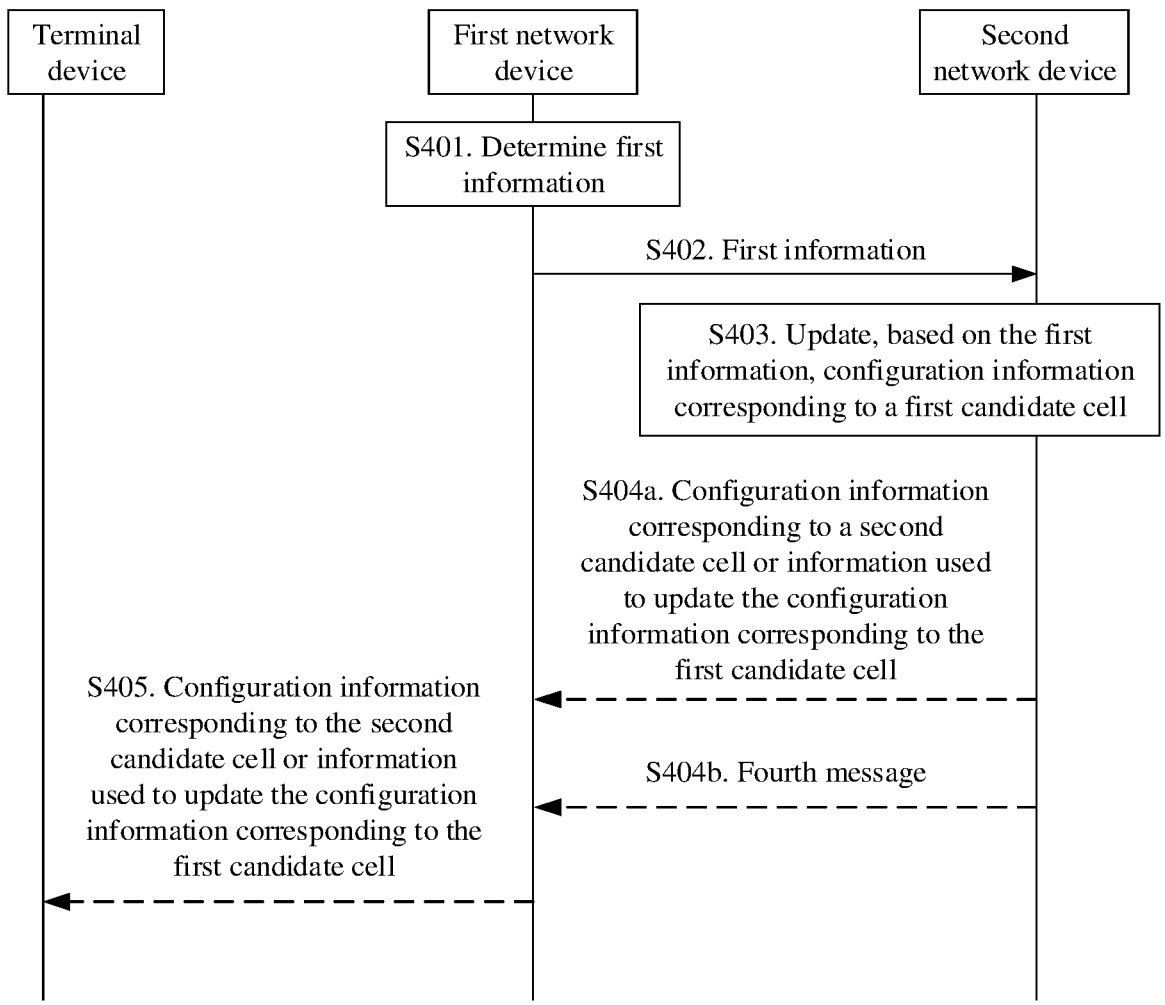
FIG. 4 is a schematic flowchart of an information update method according to an embodiment of this application.

FIG. 4 shows an information update method according to an embodiment of this application. The information update method includes the following steps.

S401. A first network device determines first information.

The first network device is a network device that manages a source cell. This may also be understood as that the source cell is managed by the first network device. The source cell is a current serving cell of a terminal device.

The first information is used by the first network device and/or a second network device to update configuration information corresponding to a first candidate cell to obtain configuration information corresponding to a second candidate cell. The first candidate cell is a candidate cell that is managed by the second network device and that is included in conditional handover configuration information sent by the first network device to the terminal device at a moment closest to a current moment. The first candidate cell includes at least one cell, the second candidate cell is managed by the second network device, and the second candidate cell includes at least one cell. A cell included in the first candidate cell may be the same as or different from a cell included in the second candidate cell, one or some cells in the second candidate cell may be included in the first candidate cell, or one or some cells in the second candidate cell may not be included in the first candidate cell. This is not specifically limited in this embodiment of this application. An implementation in which the first network device and/or the second network device update/updates the configuration information corresponding to the first candidate cell is described in detail in subsequent steps, and details are not described herein.

It should be noted that in this embodiment of this application, the first network device may also be referred to as a source network device, and the second network device may also be referred to as a candidate network device. This is not specifically limited in this embodiment of this application.

In different implementations, the first information may have the following three cases:

Case 1: The first information is used to indicate first configuration information corresponding to the source cell.

The first network device may update second configuration information corresponding to the source cell to obtain the first configuration information corresponding to the source cell, that is, the first configuration information corresponding to the source cell is obtained by the first network device by updating the second configuration information corresponding to the source cell.

The second configuration information corresponding to the source cell is newest (or latest) configuration information corresponding to the source cell before a current update occurs. In other words, the first network device may update configuration information corresponding to the source cell for a plurality of times, and each update is performed based on newest configuration information obtained through a previous update.

For example, for the first update performed by the first network device on the configuration information corresponding to the source cell, initial configuration information of the source cell may be updated to obtain configuration information 1 corresponding to the source cell. That is, newest configuration information corresponding to the source cell before the second update is the configuration information 1. In this case, the second update is performed based on the configuration information 1 corresponding to the source cell to obtain configuration information 2 corresponding to the source cell. That is, newest configuration information corresponding to the source cell before the third update is the configuration information 2. In this case, the third update is performed based on the configuration information 2 corresponding to the source cell to obtain configuration information 3 corresponding to the source cell, and so on. In this case, if the first network device updates the second configuration information corresponding to the source cell to obtain the first configuration information corresponding to the source cell, and this process is the second update, the second configuration information corresponding to the source cell is the configuration information 1, and the first configuration information corresponding to the source cell is the configuration information 2. If the first network device updates the second configuration information corresponding to the source cell to obtain the first configuration information corresponding to the source cell, and this process is the first update, the second configuration information corresponding to the source cell is the initial configuration information, and the first configuration information corresponding to the source cell is the configuration information 1.

Optionally, the configuration information (including the configuration information corresponding to the first candidate cell, the configuration information corresponding to the second candidate cell, the first configuration information corresponding to the source cell, and the second configuration information corresponding to the source cell) in this embodiment of this application may include one or more of the following: a C-RNTI allocated by a cell to the terminal device, measurement configuration information, bearer configuration information, physical layer configuration information, MAC layer configuration information, RLC layer configuration information, PDCP layer configuration information, SDAP layer configuration information, or radio resource configuration information. The radio resource configuration information may include random access (RACH) resource configuration information and the like.

Optionally, the bearer configuration information may include one or more of the following: protocol data unit (PDU) session (PDU session) information, quality of service (QoS) flow (QoS flow) information, evolved universal terrestrial radio access network (E-UTRAN) radio access bearer (RAB) (E-RAB) information, and the like. The PDU session information may include a PDU session identifier, a PDU session type, a PDU session resource aggregate maximum bit rate, and the like. The QoS flow information may include a QoS flow identifier, a QoS flow level (, QoS flow parameters (QoS parameters), and the like. For details, refer to explanations of the information element PDU Session Resources To Be Setup List in the protocol TS38.423-f40. The E-RAB information may include an E-RAB ID, a bearer type, E-RAB level QoS flow parameters, and the like. For details, refer to explanations of the information element E-RABs To Be Setup List in the protocol TS36.423-f60.

Optionally, the first configuration information and the second configuration information corresponding to the source cell may include a same parameter (for example, of a same parameter type), but have different specific values. For example, both the first configuration information and the second configuration information corresponding to the source cell include measurement configuration information, measurement configuration information in the second configuration information that corresponds to the source cell and that exists before the update is measurement configuration information 1, and measurement configuration information in the first configuration information that corresponds to the source cell and that is obtained through the update is measurement configuration information 2. Alternatively, the first configuration information and the second configuration information corresponding to the source cell may include different parameters (for example, of different parameter types). For example, the second configuration information that corresponds to the source cell and that exists before the update includes measurement configuration information, and the first configuration information that corresponds to the source cell and that is obtained through the update includes measurement configuration information and bearer configuration information. That is, updating the second configuration information corresponding to the source cell may be understood as modifying values of parameters of a same type in the second configuration information corresponding to the source cell, and/or modifying a parameter type in the second configuration information corresponding to the source cell.

In the case 1, the first information may further have the following two forms:

Form 1: The first information includes the first configuration information corresponding to the source cell.

To be specific, the first information includes newest complete configuration information corresponding to the source cell that is obtained by updating the second configuration information corresponding to the source cell, where the complete configuration information may also be understood as full configuration information.

Form 2: The first information includes information used to update the second configuration information corresponding to the source cell.

To be specific, the first network device and/or the second network device may update the source cell based on both the information used to update the second configuration information corresponding to the source cell and the second configuration information corresponding to the source cell, to obtain the first configuration information corresponding to the source cell.

The information used to update the second configuration information corresponding to the source cell may be understood as information about a changed part of the first configuration information corresponding to the source cell relative to the second configuration information corresponding to the source cell, and the information about the changed part may also be understood as delta configuration information. For example, the second configuration information that corresponds to the source cell and that exists before the update includes measurement configuration information, and the first configuration information that corresponds to the source cell and that is obtained through the update includes measurement configuration information and bearer configuration information. If it is assumed that the measurement configuration information included in the first configuration information that corresponds to the source cell and that is obtained through the update is the same as the measurement configuration information included in the second configuration information that corresponds to the source cell and that exists before the update, the information used to update the second configuration information corresponding to the source cell is the bearer configuration information.

Case 2: The first information is used to indicate that second configuration information corresponding to the source cell is not updated.

In the case 2, newest configuration information corresponding to the source cell at the current moment is the second configuration information corresponding to the source cell. Alternatively, at the current moment, the second configuration information corresponding to the source cell does not change.

Case 3: The first information includes the configuration information corresponding to the second candidate cell or information used to update the configuration information corresponding to the first candidate cell.

Optionally, in the case 3, the first network device may first update second configuration information corresponding to the source cell to obtain first configuration information corresponding to the source cell, and then determine, based on the first configuration information corresponding to the source cell, the configuration information corresponding to the second candidate cell. Instead, the second network device does not determine the configuration information corresponding to the second candidate cell.

Alternatively, optionally, in the case 3, the first network device may first update second configuration information corresponding to the source cell to obtain first configuration information corresponding to the source cell, and then determine, based on the first configuration information corresponding to the source cell, the information used to update the configuration information corresponding to the first candidate cell.

The first network device and/or the second network device may update, based on the information used to update the configuration information corresponding to the first candidate cell, the configuration information corresponding to the first candidate cell to obtain the configuration information corresponding to the second candidate cell.

The information used to update the configuration information corresponding to the first candidate cell may be understood as information about a changed part of the configuration information corresponding to the second candidate cell relative to the configuration information corresponding to the first candidate cell.

The changed part of the configuration information corresponding to the second candidate cell relative to the configuration information corresponding to the first candidate cell may include at least one of the following cases: The first candidate cell and the second candidate cell include a same cell, but configuration information corresponding to the same cell is different. For example, the configuration information corresponding to the first candidate cell includes bearer configuration information 1 of a cell 1, and the configuration information corresponding to the second candidate cell includes bearer configuration information 2 of the cell 1. Alternatively, the first candidate cell and the second candidate cell include different cells. For example, the configuration information corresponding to the first candidate cell includes bearer configuration information 1 of a cell 1, and the configuration information corresponding to the second candidate cell includes bearer configuration information 2 of a cell 2. Alternatively, a same cell included in the first candidate cell and the second candidate cell corresponds to different configuration information, and the second candidate cell includes a candidate cell that is not included in the first candidate cell. For example, the configuration information corresponding to the first candidate cell includes bearer configuration information 1 of a cell 1, and the configuration information corresponding to the second candidate cell includes bearer configuration information 2 of the cell 1 and bearer configuration information 3 corresponding to a cell 2. Alternatively, the configuration information corresponding to the second candidate cell includes configuration information corresponding to some cells in the first candidate cell. For example, the configuration information corresponding to the first candidate cell includes bearer configuration information 1 of a cell 1 and bearer configuration information 1 of a cell 2, and the configuration information corresponding to the second candidate cell includes measurement configuration information 1 of the cell 1.

S402. The first network device sends the first information to the second network device. Correspondingly, the second network device receives the first information from the first network device.

Optionally, the first network device may send a first message to the second network device, where the first message includes (or carries) the first information. The first message may be an existing Xn message or X2 message, or may be a newly defined Xn message or X2 message. This is not specifically limited in this embodiment of this application.

It should be noted that, in this embodiment of this application, when the first network device is a first CU and the second network device is a second CU, or when the first network device includes a first CU and a first DU and the second network device includes a second CU and a second DU, that the first network device sends the first information to the second network device may be that the first CU sends the first information to the second CU.

In this case, in a possible implementation, optionally, if the first information is generated by the first DU, before the first CU sends the first information to the second CU, the first DU may send the first information to the first CU. Further, optionally, before the first DU sends the first information to the first CU, the first CU requests the first DU to send the first information to the first CU. Optionally, after receiving the first information, the second CU may send the first information to the second DU. Further, optionally, before the second CU sends the first information to the second DU, the second DU requests the second CU to send the first information to the second DU.

In another possible implementation, optionally, if the first information is generated by the first CU, the first CU may send the first information to the first DU. Further, optionally, before the first CU sends the first information to the first DU, the first DU requests the first CU to send the first information to the first DU. Optionally, after receiving the first information, the second CU may send the first information to the second DU. Further, optionally, before the second CU sends the first information to the second DU, the second DU requests the second CU to send the first information to the second DU.

It should be noted that, in this embodiment of this application, when the first network device is a first CU and the second network device is a second CU, or when the first network device includes a first CU and a first DU and the second network device includes a second CU and a second DU, that the first network device sends the first message to the second network device may be that the first CU sends the first message to the second CU.

Optionally, before the first CU sends the first message to the second CU, the first DU may send a message 1 to the first CU. The message 1 may include the first information. The message 1 may be an existing F1 interface message or a newly defined F1 interface message. This is not specifically limited in this embodiment of this application. Optionally, after receiving the first message, the second CU may send a message 2 to the second DU. The message 2 may include the first information. The message 2 may be an existing F1 interface message or a newly defined F1 interface message. This is not specifically limited in this embodiment of this application.

Optionally, depending on different content of the first information, scenarios in which the first network device sends the first information to the second network device may be different.

If the first information is as described in the case 1 in step S401, the first network device may send the first information to the second network device in the following two scenarios:

In a possible scenario, once the first network device updates the second configuration information corresponding to the source cell, or once the first network device obtains the first configuration information corresponding to the source cell, the first network device sends the first information to the second network device.

Optionally, in this scenario, the first network device may further send first indication information to the second network device. The first indication information is used to indicate that the first information includes the first configuration information corresponding to the source cell (that is, the full configuration information corresponding to the source cell), or the first indication information is used to indicate that the first information includes the information used to update the second configuration information corresponding to the source cell (that is, the delta configuration information corresponding to the source cell). Alternatively, the first network device may not send first indication information to the second network device. As agreed in a protocol, the first information includes the first configuration information corresponding to the source cell (that is, the full configuration information corresponding to the source cell), or the first information includes the information used to update the second configuration information corresponding to the source cell (that is, the delta configuration information corresponding to the source cell). This is not specifically limited in this embodiment of this application.

Optionally, when the first network device is a first CU and the second network device is a second CU, or when the first network device includes a first CU and a first DU and the second network device includes a second CU and a second DU, that the first network device sends the first indication information to the second network device may be that the first CU sends the first indication information to the second CU.

In this case, in a possible implementation, optionally, if the first indication information is generated by the first DU, before the first CU sends the first indication information to the second CU, the first DU may send the first indication information to the first CU. Further, optionally, before the first DU sends the first indication information to the first CU, the first CU requests the first DU to send the first indication information to the first CU. Optionally, after receiving the first indication information, the second CU may send the first indication information to the second DU. Further, optionally, before the second CU sends the first indication information to the second DU, the second DU requests the second CU to send the first indication information to the second DU.

In another possible implementation, optionally, if the first indication information is generated by the first CU, the first CU may send the first indication information to the first DU. Further, optionally, before the first CU sends the first indication information to the first DU, the first DU requests the first CU to send the first indication information to the first DU. Optionally, after receiving the first indication information, the second CU may send the first indication information to the second DU. Further, optionally, before the second CU sends the first indication information to the second DU, the second DU requests the second CU to send the first indication information to the second DU.

The first indication information may be included in the first message, or may be included in another message that is sent to the second network device before or after the first message is sent. This is not specifically limited in this embodiment of this application. The first indication information may be a binary value (or a bit). For example, when the binary value is "1", it indicates that the first information carried in the first message includes the first configuration information corresponding to the source cell. When the binary value is "0", it indicates that the first information carried in the first message includes the information used to update the second configuration information corresponding to the source cell. Alternatively, the first indication information may be a Boolean value. For example, when the Boolean value is "true", it indicates that the first information carried in the first message includes the first configuration information corresponding to the source cell. When the Boolean value is "false", it indicates that the first information carried in the first message includes the information used to update the second configuration information corresponding to the source cell. Alternatively, the first indication information may be an information element. For example, when the first message includes the information element, it indicates that the first information carried in the first message includes the first configuration information corresponding to the source cell. When the first message does not include the information element, it indicates that the first information carried in the first message includes the information used to update the second configuration information corresponding to the source cell. Alternatively, the first indication information may be represented in another form. This is not specifically limited in this embodiment of this application.

Optionally, the first network device may further send second indication information to the second network device, where the second indication information is used to indicate whether the second configuration information corresponding to the source cell changes, so that the second network device can correctly understand a meaning of the first message. For example, when the second configuration information corresponding to the source cell changes, the second indication information may be used to indicate that the second configuration information corresponding to the source cell changes; when the second configuration information corresponding to the source cell does not change, the second indication information may be used to indicate that the second configuration information corresponding to the source cell does not change. For a representation form of the second indication information, refer to related descriptions of the representation form of the first indication information. Details are not described herein again.

Optionally, when the first network device is a first CU and the second network device is a second CU, or when the first network device includes a first CU and a first DU and the second network device includes a second CU and a second DU, for a manner in which the first network device sends the second indication information to the second network device, refer to the foregoing manner in which the first network device sends the first information or the first indication information to the second network device. Details are not described herein again.

Optionally, the second indication information may be included in the first message, or may be included in another message. This is not specifically limited in this embodiment of this application.

It should be noted that, in this scenario, once the first network device updates the second configuration information corresponding to the source cell, the first network device sends the first message to the second network device. Therefore, it may be understood that the first network device actively initiates configuration information update on a network device side in this scenario.

In another possible scenario, before step S402 is performed, the second network device sends second information to the first network device, where the second information is used to request configuration information corresponding to the source cell at the current moment. After receiving the second information from the second network device, the first network device replies to the received second information depending on whether the second configuration information corresponding to the source cell changes. For example, if the second configuration information corresponding to the source cell changes, the first network device sends the first information to the second network device, or replies with the first message, where the first message includes the first information.

Optionally, the second network device may send a second message to the first network device, where the second message includes (or carries) the second information. The second message may be an existing Xn message or X2 message, or may be a newly defined Xn message or X2 message. This is not specifically limited in this embodiment of this application.

Optionally, when the first network device is a first CU and the second network device is a second CU, or when the first network device includes a first CU and a first DU and the second network device includes a second CU and a second DU, that the second network device sends the second information to the first network device may be that the second CU sends the second information to the first CU.

In this case, in a possible implementation, optionally, if the second information is generated by the second DU, before the second CU sends the second information to the first CU, the second DU may send the second information to the second CU. Further, optionally, before the second DU sends the second information to the second CU, the second CU requests the second DU to send the second information to the second CU. Optionally, after receiving the second information, the first CU may send the second information to the first DU. Further, optionally, before the first CU sends the second information to the first DU, the first DU requests the first CU to send the second information to the first DU.

In another possible implementation, optionally, if the second information is generated by the second CU, the second CU may send the second information to the second DU. Further, optionally, before the second CU sends the second information to the second DU, the second DU requests the second CU to send the second information to the second DU. Optionally, after receiving the second information, the first CU may send the second information to the first DU. Further, optionally, before the first CU sends the second information to the first DU, the first DU requests the first CU to send the second information to the first DU.

Optionally, when the first network device includes a first CU and a first DU, and the second network device includes a second CU and a second DU, that the second network device sends the second message to the first network device may be that the second CU sends the second message to the first CU. Optionally, before the second CU sends the second message to the first CU, the second DU may send a message 3 to the second CU. The message 3 may include the second information. The message 3 may be an existing F1 interface message or a newly defined F1 interface message. This is not specifically limited in this embodiment of this application. Optionally, after receiving the second message, the first CU may send a message 4 to the first DU. The message 4 may include the second information. The message 4 may be an existing F1 interface message or a newly defined F1 interface message. This is not specifically limited in this embodiment of this application.

The current moment in this scenario may be understood as a moment at which the first network device receives the second message, a moment at which the first network device receives the second information, or a moment at which the first network device receives the second message and parses out the second information. This is not specifically limited in this embodiment of this application.

Optionally, in this scenario, the second network device may further send third indication information to the first network device. The third indication information is used to indicate that the second network device requests, from the first network device, the first configuration information corresponding to the source cell, or the third indication information is used to indicate that the second network device requests, from the first network device, the information used to update the second configuration information corresponding to the source cell. Alternatively, the third indication information is used to indicate: if the second configuration information corresponding to the source cell changes, whether the first information sent by the first network device includes the first configuration information corresponding to the source cell or includes the information used to update the second configuration information corresponding to the source cell. Alternatively, the second network device may not send third indication information to the first network device. As agreed in a protocol, the second network device requests, from the first network device, the first configuration information corresponding to the source cell, or the second network device requests, from the first network device, the information used to update the second configuration information corresponding to the source cell. Alternatively, as agreed in a protocol, the first information includes the first configuration information corresponding to the source cell, or the first information includes the information used to update the second configuration information corresponding to the source cell. This is not specifically limited in this embodiment of this application.

Optionally, when the first network device is a first CU and the second network device is a second CU, or when the first network device includes a first CU and a first DU and the second network device includes a second CU and a second DU, that the second network device sends the third indication information to the first network device may be that the second CU sends the third indication information to the first CU.

In this case, in a possible implementation, optionally, if the third indication information is generated by the second DU, before the second CU sends the third indication information to the first CU, the second DU may send the third indication information to the second CU. Further, optionally, before the second DU sends the third indication information to the second CU, the second CU requests the second DU to send the third indication information to the second CU. Optionally, after receiving the third indication information, the first CU may send the third indication information to the first DU. Further, optionally, before the first CU sends the third indication information to the first DU, the first DU requests the first CU to send the third indication information to the first DU.

In another possible implementation, optionally, if the third indication information is generated by the second CU, the second CU may send the third indication information to the second DU. Further, optionally, before the second CU sends the third indication information to the second DU, the second DU requests the second CU to send the third indication information to the second DU. Optionally, after receiving the third indication information, the first CU may send the third indication information to the first DU. Further, optionally, before the first CU sends the third indication information to the first DU, the first DU requests the first CU to send the third indication information to the first DU.

The third indication information may be included in the second message, or may be included in another message sent to the first network device before or after the second message is sent. For a representation form of the third indication information, refer to related descriptions of the representation form of the first indication information. Details are not described herein again.

Optionally, if the third indication information is included in the second message, after the first network device receives the second message, if the third indication information indicates that the second network device requests, from the first network device, the first configuration information corresponding to the source cell, and that the second configuration information corresponding to the source cell changes, the first information sent by the first network device includes the first configuration information corresponding to the source cell. In this case, if the first network device sends the first indication information to the second network device, the first indication information is used to indicate that the first information includes the first configuration information corresponding to the source cell. If the third indication information indicates that the second network device requests, from the first network device, the information used to update the second configuration information corresponding to the source cell, and that the second configuration information corresponding to the source cell changes, the first information sent by the first network device includes the information used to update the second configuration information corresponding to the source cell. In this case, if the first network device sends the first indication information to the second network device, the first indication information is used to indicate that the first information includes the information used to update the second configuration information corresponding to the source cell.

Optionally, in this scenario, the second network device may further send fourth indication information to the first network device. The fourth indication information is used to request the first network device to send, to the second network device, the configuration information corresponding to the source cell at the current moment. For a representation form of the fourth indication information, refer to related descriptions of the representation form of the first indication information. Details are not described herein again. The fourth indication information may be included in the second message, or may be included in another message. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the fourth indication information to the first network device, refer to the foregoing manner in which the second network device sends the third indication information to the first network device. Details are not described herein again.

It should be noted that, in this scenario, because the second network device requests, from the first network device, the configuration information corresponding to the source cell at the current moment, the second network device actively initiates configuration information update on a network device side in this scenario.

If the first information is as described in the case 2 in step S401, the first network device may send the first information to the second network device in the following scenario: Before step S402 is performed, the second network device sends second information to the first network device, where the second information is used to request configuration information corresponding to the source cell at a current moment. After receiving the second information from the second network device, the first network device replies to the received second information depending on whether the second configuration information corresponding to the source cell changes. For example, if the second configuration information corresponding to the source cell does not change, the first network device sends the first information to the second network device, or replies with the first message. The first message may be used to notify that the second configuration information corresponding to the source cell does not change. For example, in the scenario shown in the case 2, the first network device sends the first message to the second network device, to notify the second network device that the second configuration information corresponding to the source cell does not change.

The second network device may send a second message to the first network device, where the second message carries the second information. Optionally, the second network device may further send third indication information and/or fourth indication information to the first network device. For detailed descriptions, refer to the foregoing related descriptions. Details are not described herein again.

Optionally, after receiving the second information from the second network device, if the first network device determines that the configuration information corresponding to the source cell at the current moment is the second configuration information corresponding to the source cell (that is, the second configuration information corresponding to the source cell does not change), the first network device sends the first information to the second network device, or replies with the first message, where the first message is used to indicate that the second configuration information corresponding to the source cell is not updated. Specifically, the first information included in the first message is used to indicate that the second configuration information corresponding to the source cell does not change. Alternatively, the first message may include (or carry) fifth indication information, and the fifth indication information is used to indicate that the second configuration information corresponding to the source cell does not change. In other words, the first network device may further send the fifth indication information to the second network device. The fifth indication information may be included in the first message, or may be included in another message. This is not specifically limited in this embodiment of this application. For a representation form of the fifth indication information, refer to related descriptions of the representation form of the first indication information. Details are not described herein again.

Optionally, when the first network device is a first CU and the second network device is a second CU, or when the first network device includes a first CU and a first DU and the second network device includes a second CU and a second DU, for a manner in which the first network device sends the fifth indication information to the second network device, refer to the foregoing manner in which the first network device sends the first indication information to the second network device. Details are not described herein again.

Alternatively, optionally, when determining that the configuration information corresponding to the source cell at the current moment is the second configuration information corresponding to the source cell (that is, the second configuration information corresponding to the source cell does not change), the first network device may not send the first information to the second network device. In this case, as agreed in a protocol, when the first network device does not reply to the second message, it may indicate that the second configuration information corresponding to the source cell is not updated (or does not change).

It may be understood that the second network device actively initiates configuration information update on a network device side in this scenario.

If the first information is as described in the case 3 in step S401, the first network device may send the first information to the second network device in the following scenario: Once the first network device updates the configuration information corresponding to the first candidate cell to obtain the configuration information corresponding to the second candidate cell (for example, when the first network device updates, based on the first configuration information corresponding to the source cell, the configuration information corresponding to the first candidate cell), the first network device sends the first information to the second network device, where the first information includes the configuration information corresponding to the second candidate cell, or the first information includes the information used to update the configuration information corresponding to the first candidate cell.

Optionally, in this scenario, the first network device may further send sixth indication information to the second network device, where the sixth indication information is used to indicate that the first information includes the configuration information corresponding to the second candidate cell (that is, full configuration information corresponding to a candidate cell, where the candidate cell is at least one cell that is managed by the second network device), or the sixth indication information is used to indicate that the first information includes the information used to update the configuration information corresponding to the first candidate cell (that is, delta configuration information corresponding to a candidate cell, where the candidate cell is at least one cell that is managed by the second network device). Alternatively, the first network device may not send sixth indication information to the second network device. As agreed in a protocol, the first information includes the configuration information corresponding to the second candidate cell (that is, full configuration information corresponding to a candidate cell, where the candidate cell is at least one cell that is managed by the second network device), or the first information includes the information used to update the configuration information corresponding to the first candidate cell (that is, delta configuration information corresponding to a candidate cell, where the candidate cell is at least one cell that is managed by the second network device). This is not specifically limited in this embodiment of this application.

The sixth indication information may be included in the first message, or may be included in another message. This is not specifically limited in this embodiment of this application. For a representation form of the sixth indication information, refer to related descriptions of the representation form of the first indication information. Details are not described herein again.

Optionally, when the first network device is a first CU and the second network device is a second CU, or when the first network device includes a first CU and a first DU and the second network device includes a second CU and a second DU, for a manner in which the first network device sends the sixth indication information to the second network device, refer to the foregoing manner in which the first network device sends the first indication information to the second network device. Details are not described herein again.

It may be understood that the first network device actively initiates configuration information update on a network device side in this scenario.

S403. The second network device updates, based on the first information, the configuration information corresponding to the first candidate cell to obtain the configuration information corresponding to the second candidate cell.

For descriptions of the first candidate cell and the second candidate cell, refer to related descriptions in step S401. Details are not described herein again. Optionally, that the second network device updates, based on the first information, the configuration information corresponding to the first candidate cell may include: modifying configuration information corresponding to a first cell, releasing configuration information corresponding to a second cell, and/or adding configuration information corresponding to a third cell. The first cell is at least one cell in the first candidate cell, the second cell is at least one cell in the first candidate cell, the third cell is at least one cell in the second candidate cell, and the third cell is not included in the first candidate cell.

That the second network device updates, based on the first information, the configuration information corresponding to the first candidate cell to obtain the configuration information corresponding to the second candidate cell may also be understood as follows: The second network device reconfigures a candidate cell based on the first information (where the candidate cell herein may be understood as a candidate cell in general that is managed by the second network device, and specifically, the candidate cell herein may include a candidate cell (for example, the first candidate cell) that has been configured before and/or a candidate cell that has not been configured before) to obtain the configuration information corresponding to the second candidate cell.

Correspondingly, in this case, the first information is used by the second network device to reconfigure the candidate cell, to obtain the configuration information corresponding to the second candidate cell. That the second network device reconfigures a candidate cell based on the first information may include: The second network device modifies configuration information corresponding to the at least one cell in the first candidate cell, releases configuration information corresponding to the at least one cell in the first candidate cell, and/or adds configuration information corresponding to a candidate cell that has not been configured before and that is managed by the second network device.

Correspondingly, in this embodiment of this application, "updating the configuration information corresponding to the first candidate cell" may also be replaced with "reconfiguring a candidate cell"; "information used to update the configuration information corresponding to the first candidate cell" may be replaced with "information used to reconfigure a candidate cell"; and "used to update the configuration information corresponding to the first candidate cell" may be replaced with "used to reconfigure the candidate cell".

Optionally, when the second network device is a second CU or when the second network device includes a second CU and a second DU, "the second network device updates, based on the first information, the configuration information corresponding to the first candidate cell to obtain the configuration information corresponding to the second candidate cell" may mean "the second CU and/or the second DU update/updates, based on the first information, the configuration information corresponding to the first candidate cell to obtain the configuration information corresponding to the second candidate cell".

Correspondingly, that the second network device reconfigures a candidate cell based on the first information to obtain the configuration information corresponding to the second candidate cell may be "the second CU and/or the second DU reconfigure/reconfigures the candidate cell based on the first information to obtain the configuration information corresponding to the second candidate cell".

It should be noted that, in this embodiment of this application, releasing configuration information corresponding to a cell may also be understood as releasing or deactivating the configuration information corresponding to the cell. A general description is provided herein, and details are not described in the following embodiments. For example, releasing configuration information corresponding to a cell may also be understood as releasing or releasing a C-RNTI allocated by the cell to the terminal device, or measurement configuration information, bearer configuration information, physical layer configuration information, MAC layer configuration information, RLC layer configuration information, PDCP layer configuration information, SDAP layer configuration information, or radio resource configuration information corresponding to the cell.

Optionally, depending on different content of the first information, processing of updating, by the second network device based on the first information, the configuration information corresponding to the first candidate cell (or reconfiguring a candidate cell) varies.

When the first information includes the first configuration information corresponding to the source cell, that the second network device updates, based on the first information, the configuration information corresponding to the first candidate cell may include: The second network device updates, based on the first configuration information corresponding to the source cell, the configuration information corresponding to the first candidate cell.

Alternatively, when the first information includes the first configuration information corresponding to the source cell, that the second network device reconfigures a candidate cell based on the first information may include: The second network device reconfigures, based on the first configuration information corresponding to the source cell, configuration information corresponding to the candidate cell.

When the first information includes the information used to update the second configuration information corresponding to the source cell, that the second network device updates, based on the first information, the configuration information corresponding to the first candidate cell may include: The second network device updates, based on the information used to update the second configuration information corresponding to the source cell and the second configuration information corresponding to the source cell, the second configuration information corresponding to the source cell to obtain the first configuration information corresponding to the source cell, and then updates, based on the first configuration information corresponding to the source cell, the configuration information corresponding to the first candidate cell.

Alternatively, when the first information includes the information used to update the second configuration information corresponding to the source cell, that the second network device reconfigures a candidate cell based on the first information may include: The second network device updates, based on the information used to update the second configuration information corresponding to the source cell and the second configuration information corresponding to the source cell, the second configuration information corresponding to the source cell to obtain the first configuration information corresponding to the source cell, and then reconfigures, based on the first configuration information corresponding to the source cell, configuration information corresponding to the candidate cell.

Optionally, the second configuration information corresponding to the source cell may be sent by the first network device to the second network device when the first network device and the second network device most recently perform handover preparation for the conditional handover. For example, in a most recent handover preparation procedure, the first network device adds the second configuration information corresponding to the source cell to a handover request message, and sends the handover request message to the second network device.

When the first information is used to indicate that the second configuration information corresponding to the source cell is not updated, that the second network device updates, based on the first information, the configuration information corresponding to the first candidate cell may include: The second network device updates, based on the second configuration information corresponding to the source cell, the configuration information corresponding to the first candidate cell.

Alternatively, when the first information is used to indicate that the second configuration information corresponding to the source cell is not updated, that the second network device reconfigures a candidate cell based on the first information may include: The second network device reconfigures, based on the second configuration information corresponding to the source cell, configuration information corresponding to the candidate cell.

When the first information includes the configuration information corresponding to the second candidate cell, that the second network device updates, based on the first information, the configuration information corresponding to the first candidate cell may include: The second network device releases the configuration information corresponding to the first candidate cell, and uses the configuration information corresponding to the second candidate cell, that is, uses the configuration information corresponding to the second candidate cell as latest configuration information. Alternatively, when the first information includes the information used to update the configuration information corresponding to the first candidate cell, that the second network device updates, based on the first information, the configuration information corresponding to the first candidate cell may include: The second network device updates, based on the information used to update the configuration information corresponding to the first candidate cell and the configuration information corresponding to the first candidate cell, the configuration information corresponding to the first candidate cell to obtain the configuration information corresponding to the second candidate cell.

Alternatively, when the first information includes the configuration information corresponding to the second candidate cell, that the second network device reconfigures a candidate cell based on the first information may include: The second network device releases the configuration information corresponding to the first candidate cell, and uses the configuration information corresponding to the second candidate cell, that is, uses the configuration information corresponding to the second candidate cell as latest configuration information, or uses the configuration information corresponding to the second candidate cell as configuration information obtained after the candidate cell is reconfigured. Alternatively, when the first information includes the information used to update the configuration information corresponding to the first candidate cell, that the second network device reconfigures a candidate cell based on the first information may include: The second network device reconfigures the candidate cell based on the information used to update the configuration information corresponding to the first candidate cell and the configuration information corresponding to the first candidate cell, to obtain the configuration information corresponding to the second candidate cell.

Based on this solution, the first network device can determine the first information and send the first information to the second network device, and the second network device can update, based on the first information sent by the first network device, the configuration information corresponding to the first candidate cell. Therefore, the network device side can update configuration information corresponding to a candidate cell. According to updating configuration information corresponding to a candidate cell in a timely and proper manner, flexibility and reliability of a conditional handover mechanism are thereby improved.

In an implementation scenario of this embodiment of this application, when the first information is used to indicate the first configuration information corresponding to the source cell, and/or the first information is used to indicate that the second configuration information corresponding to the source cell is not updated, the information update method provided in this embodiment of this application further includes the following step S404a:

S404a. The second network device sends, to the first network device, the configuration information corresponding to the second candidate cell or the information used to update the configuration information corresponding to the first candidate cell. Correspondingly, the first network device receives, from the second network device, the configuration information corresponding to the second candidate cell or the information used to update the configuration information corresponding to the first candidate cell.

Optionally, the second network device may send a third message to the first network device, where the third message includes (or carries) the configuration information corresponding to the second candidate cell or the information used to update the configuration information corresponding to the first candidate cell. The third message may be an existing Xn message or X2 message, or may be a newly defined Xn message or X2 message. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the third message to the first network device, refer to the foregoing manner in which the second network device sends the second message to the first network device. Details are not described herein again.

Optionally, the second network device may send seventh indication information to the first network device, where the seventh indication information is used to indicate that the second network device sends the configuration information corresponding to the second candidate cell (that is, full configuration information corresponding to a candidate cell, where the candidate cell is at least one cell that is managed by the second network device) to the first network device, or the seventh indication information is used to indicate that the second network device sends the information used to update the configuration information corresponding to the first candidate cell (that is, delta configuration information corresponding to a candidate cell, where the candidate cell is at least one cell that is managed by the second network device) to the first network device. Alternatively, the second network device may not send seventh indication information to the first network device. As agreed in a protocol, the second network device sends the configuration information corresponding to the second candidate cell (that is, full configuration information corresponding to a candidate cell, where the candidate cell is at least one cell that is managed by the second network device) to the first network device, or the second network device sends the information used to update the configuration information corresponding to the first candidate cell (that is, delta configuration information corresponding to a candidate cell, where the candidate cell is at least one cell that is managed by the second network device)

to the first network device. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the seventh indication information to the first network device, refer to the foregoing manner in which the second network device sends the third indication information to the first network device. Details are not described herein again.

The seventh indication information may be included in the third message, or may be included in another message. For a representation form of the seventh indication information, refer to related descriptions of the representation form of the first indication information. Details are not described herein again.

Based on this solution, because the second network device may send, to the first network device, the configuration information corresponding to the second candidate cell or the information used to update the configuration information corresponding to the first candidate cell, the first network device may learn of updated configuration information corresponding to a candidate cell, to notify the terminal device of the updated candidate cell.

In another implementation scenario of this embodiment of this application, when the first information includes the configuration information corresponding to the second candidate cell or the information used to update the configuration information corresponding to the first candidate cell, the information update method provided in this embodiment of this application further includes the following step S404b:

S404b. The second network device sends a fourth message to the first network device. Correspondingly, the first network device receives the fourth message from the second network device.

The fourth message is used to notify the first network device that the second network device can comply with a configuration parameter in the first information, or is used to notify the first network device that the second network device has completed configuration based on the first information. For example, the second network device has updated, based on the first information, the configuration information corresponding to the first candidate cell.

Optionally, when the first network device is a first CU and the second network device is a second CU, or when the first network device includes a first CU and a first DU and the second network device includes a second CU and a second DU, for a manner in which the second network device sends the fourth message to the first network device, refer to the foregoing manner in which the second network device sends the second message to the first network device. Details are not described herein again.

Optionally, the fourth message may include the configuration information corresponding to the second candidate cell, or the fourth message may include the information used to update the configuration information corresponding to the first candidate cell.

Optionally, the second network device may further send eighth indication information to the first network device, where the eighth indication information is used to indicate that the fourth message carries the configuration information corresponding to the second candidate cell (that is, full configuration information corresponding to a candidate cell, where the candidate cell is at least one cell that is managed by the second network device), or the eighth indication information is used to indicate that the fourth message carries the information used to update the configuration information corresponding to the first candidate cell (that is, delta configuration information corresponding to a candidate cell, where the candidate cell is at least one cell that is managed by the second network device). Alternatively, the second network device may not send eighth indication information to the first network device. As agreed in a protocol, the fourth message carries the configuration information corresponding to the second candidate cell (that is, full configuration information corresponding to a candidate cell, where the candidate cell is at least one cell that is managed by the second network device), or the fourth message carries the information used to update the configuration information corresponding to the first candidate cell (that is, delta configuration information corresponding to a candidate cell, where the candidate cell is at least one cell that is managed by the second network device). This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the eighth indication information to the first network device, refer to the foregoing manner in which the second network device sends the third indication information to the first network device. Details are not described herein again.

The eighth indication information may be included in the fourth message, or may be included in another message. This is not specifically limited in this embodiment of this application. For a representation form of the eighth indication information, refer to related descriptions of the representation form of the first indication information. Details are not described herein again.

In still another implementation scenario of this embodiment of this application, when the first information includes the configuration information corresponding to the second candidate cell or the information used to update the configuration information corresponding to the first candidate cell, the second network device may not perform step S404b, that is, the second network device does not send the fourth message to the first network device. For example, when the second network device rejects the first information (or the first message), the second network device may not send the fourth message to the first network device. Optionally, in this case, the second network device may send another message to the first network device, to notify the first network device that the second network device rejects the first information (or the first message). That the second network device rejects the first information (or the first message) may be understood as that the second network device is unable to or cannot update, based on the configuration parameter in the first information, the configuration information corresponding to the first candidate cell. This is not specifically limited in this embodiment of this application.

Optionally, the information update method provided in this embodiment of this application further includes the following step S405:

S405. The first network device sends, to the terminal device, the configuration information corresponding to the second candidate cell or the information used to update the configuration information corresponding to the first candidate cell.

Optionally, the first network device may send a fifth message to the terminal device, where the fifth message includes (or carries) the configuration information corresponding to the second candidate cell or the information used to update the configuration information corresponding to the first candidate cell. For example, the fifth message may be an RRC reconfiguration message, or may be another message. This is not specifically limited in this embodiment of this application.

Optionally, when the first network device is a first CU and the second network device is a second CU, or when the first network device includes a first CU and a first DU, that the first network device sends the fifth message to the terminal device may be: The first DU sends a message 5 to the terminal device, where the message 5 may include the configuration information corresponding to the second candidate cell or the information used to update the configuration information corresponding to the first candidate cell. The message 5 may be an existing RRC message, or may be another message. This is not specifically limited in this embodiment of this application.

Optionally, the first network device may further send ninth indication information to the terminal device, where the ninth indication information is used to indicate that the first network device sends the configuration information corresponding to the second candidate cell (that is, full configuration information corresponding to a candidate cell, where the candidate cell is at least one cell that is managed by the second network device) to the terminal device, or the ninth indication information is used to indicate that the first network device sends the information used to update the configuration information corresponding to the first candidate cell (that is, delta configuration information corresponding to a candidate cell, where the candidate cell is at least one cell that is managed by the second network device) to the terminal device. Alternatively, the first network device may not send ninth indication information to the terminal device. As agreed in a protocol, the first network device sends the configuration information corresponding to the second candidate cell (that is, full configuration information corresponding to a candidate cell, where the candidate cell is at least one cell that is managed by the second network device) to the terminal device, or the first network device sends the information used to update the configuration information corresponding to the first candidate cell (that is, delta configuration information corresponding to a candidate cell, where the candidate cell is at least one cell that is managed by the second network device) to the terminal device. This is not specifically limited in this embodiment of this application.

The ninth indication information may be included in the fifth message, or may be included in another message. This is not specifically limited in this embodiment of this application. For a representation form of the ninth indication information, refer to related descriptions of the representation form of the first indication information. Details are not described herein again.

Optionally, when the first network device is a first CU, that the first network device sends the ninth indication information to the terminal device may be that the first CU sends the ninth indication information to the terminal device. When the first network device includes a first CU and a first DU, that the first network device sends the ninth indication information to the terminal device may be that the first DU sends the ninth indication information to the terminal device.

Optionally, the first network device may further send, to the terminal device, a handover execution condition corresponding to the second candidate cell, configuration information corresponding to a candidate cell that is managed by another network device, and/or a handover execution condition corresponding to a candidate cell that is managed by another network device. In other words, the first network device may re-send the conditional handover configuration information to the terminal device, where the conditional handover configuration information includes configuration information and a handover execution condition that correspond to each candidate cell.

Optionally, the conditional handover configuration information re-sent by the first network device to the terminal device may be included in the fifth message, or may be included in another message. This is not specifically limited in this embodiment of this application.

Based on this solution, configuration information corresponding to a candidate cell that is updated on the network device side may be sent to the terminal device in a timely manner, so that the terminal device can update configuration information corresponding to a candidate cell in a timely manner.

It should be noted that, in this embodiment of this application, step S404a is first performed, and step S405 is then performed. In this case, when the second network device sends the configuration information corresponding to the second candidate cell to the first network device, the first network device may send the configuration information corresponding to the second candidate cell to the terminal device, or the first network device may send, to the terminal device, the information used to update the configuration information corresponding to the first candidate cell. When the second network device sends, to the first network device, the information used to update the configuration information corresponding to the first candidate cell, the first network device may send, to the terminal device, the information used to update the configuration information corresponding to the first candidate cell; or after updating, based on the information used to update the configuration information corresponding to the first candidate cell and the configuration information corresponding to the first candidate cell, the configuration information corresponding to the first candidate cell to obtain the configuration information corresponding to the second candidate cell, the first network device sends the configuration information corresponding to the second candidate cell to the terminal device.

It should be noted that, in this embodiment of this application, there is no strict execution sequence between step S404b and step S405. Step S404b may be performed before step S405, step S405 may be performed before step S404b, or step S404b and step S405 may be simultaneously performed.

Figure 5:
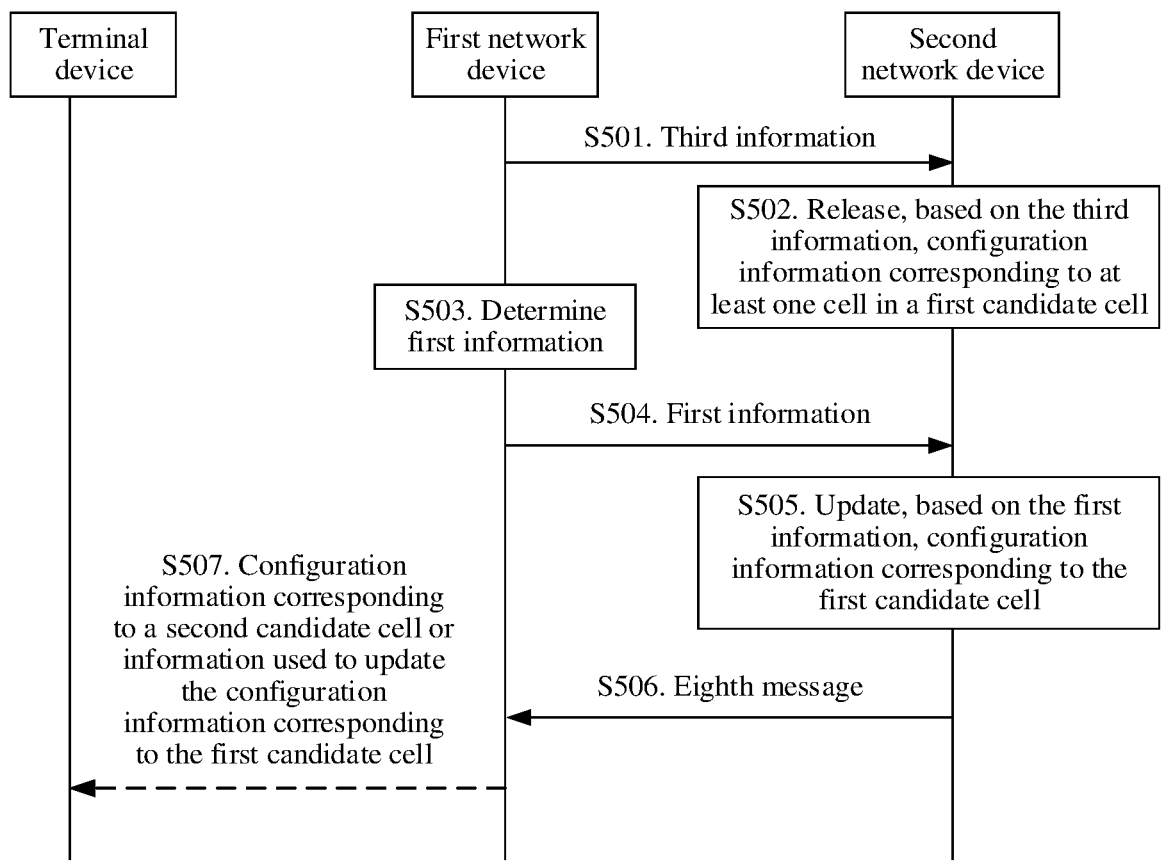
FIG. 5 is a schematic flowchart of another information update method according to an embodiment of this application.

FIG. 5 shows another information update method according to an embodiment of this application. The information update method is applicable to a scenario in which a first network device initiates update of configuration information corresponding to a candidate cell on a network device side. The information update method includes the following steps.

S501. The first network device sends third information to a second network device. Correspondingly, the second network device receives the third information from the first network device.

The third information is used to indicate to release configuration information corresponding to at least one cell in a first candidate cell, for example, a C-RNTI, measurement configuration information, bearer configuration information, physical layer configuration information, MAC layer configuration information, RLC layer configuration information, PDCP layer configuration information, SDAP layer configuration information, or radio resource configuration information that correspond to a cell 1 in the first candidate cell.

Optionally, when the first network device is a first CU and the second network device is a second CU, or when the first network device includes a first CU and a first DU and the second network device includes a second CU and a second DU, for a manner in which the first network device sends the third information to the second network device, refer to the foregoing manner in which the first network device sends the first indication information to the second network device. Details are not described herein again.

Optionally, the first network device may send a sixth message to the second network device, where the sixth message includes (or carries) the third information. For example, the sixth message may be a handover cancel (HO cancel) message or a conditional handover cancel (CHO cancel) message, may be another existing Xn or X2 message, or may be a newly defined Xn or X2 message. This is not specifically limited in this embodiment of this application.

Optionally, when the first network device is a first CU and the second network device is a second CU, or when the first network device includes a first CU and a first DU and the second network device includes a second CU and a second DU, for a manner in which the first network device sends the sixth message to the second network device, refer to the foregoing manner in which the first network device sends the first message to the second network device. Details are not described herein again.

Optionally, the third information may include identification information of at least one cell that is in the first candidate cell and that needs to be released. For example, the identification information includes at least one of a PCI, frequency information, or a CGI.

Optionally, the first network device may send cause value information to the second network device. For example, the cause value information is used to indicate a cause for releasing the configuration information corresponding to the at least one cell in the first candidate cell. Specifically, for example, the cause value information may be "the first network device initiates update of configuration information corresponding to a candidate cell", or the cause value information may have another representation form. This is not limited in this embodiment. The cause value information may be included in the sixth message, or may be included in another message. This is not specifically limited in this embodiment of this application.

Optionally, the first network device may further send third information to a terminal device, so that the terminal device also releases the configuration information corresponding to the at least one cell in the first candidate cell. This avoids a handover failure or another error caused by inconsistent understanding by the second network device and the terminal device, for example, a handover failure caused because configuration information corresponding to a candidate cell maintained/stored by the second network device is inconsistent with configuration information corresponding to a candidate cell maintained/stored by the terminal device.

S502. The second network device releases, based on the third information, the configuration information corresponding to the at least one cell in the first candidate cell.

S503. The first network device determines first information.

In different implementations, the first information may have the following three cases:

Case 1: The first information is used to indicate first configuration information corresponding to a source cell.

Case 2: The first information is used to indicate that second configuration information corresponding to a source cell is not updated.

Case 3: The first information includes configuration information corresponding to a second candidate cell or information used to update configuration information corresponding to the first candidate cell.

For related descriptions, refer to step S401. Details are not described herein again.

S504. The first network device sends the first information to the second network device. Correspondingly, the second network device receives the first information from the first network device.

Optionally, the first network device may send a seventh message to the second network device, where the seventh message includes (or carries) the first information. The seventh message may be used to notify the second network device to perform handover preparation for the CHO procedure. For example, the seventh message may be a handover request (HO request) message or a conditional handover request (CHO request) message, may be another existing Xn or X2 message, or may be a newly defined Xn or X2 message. This is not specifically limited in this embodiment of this application. For a scenario in which the first network device sends the first information to the second network device, refer to the scenario in which the first network device sends the first information to the second network device in step S402. Details are not described herein again.

Optionally, when the first network device is a first CU and the second network device is a second CU, or when the first network device includes a first CU and a first DU and the second network device includes a second CU and a second DU, for a manner in which the first network device sends the seventh message to the second network device, refer to the foregoing manner in which the first network device sends the first message to the second network device. Details are not described herein again.

S505. The second network device updates, based on the first information, the configuration information corresponding to the first candidate cell to obtain the configuration information corresponding to the second candidate cell. Optionally, that the second network device updates the configuration information corresponding to the first candidate cell may include: reconfiguring (or modifying) configuration information corresponding to a first cell, releasing configuration information corresponding to a second cell, and/or adding configuration information corresponding to a third cell. The first cell is at least one cell in the first candidate cell, the second cell is at least one cell in the first candidate cell, the third cell is at least one cell in the second candidate cell, and the third cell is not included in the first candidate cell.

That the second network device updates, based on the first information, the configuration information corresponding to the first candidate cell to obtain the configuration information corresponding to the second candidate cell may also be understood as follows: The second network device reconfigures a candidate cell based on the first information, to obtain the configuration information corresponding to the second candidate cell. For details, refer to related descriptions in step S403. Details are not described herein again.

Optionally, when the second network device is a second CU or when the second network device includes a second CU and a second DU, "the second network device updates, based on the first information, the configuration information corresponding to the first candidate cell to obtain the configuration information corresponding to the second candidate cell" may mean "the second CU and/or the second DU update/updates, based on the first information, the configuration information corresponding to the first candidate cell to obtain the configuration information corresponding to the second candidate cell".

Correspondingly, that the second network device reconfigures a candidate cell based on the first information to obtain the configuration information corresponding to the second candidate cell may be "the second CU and/or the second DU reconfigure/reconfigures the candidate cell based on the first information to obtain the configuration information corresponding to the second candidate cell".

S506. The second network device sends an eighth message to the first network device. Correspondingly, the first network device receives the eighth message from the second network device.

Optionally, the eighth message may be, for example, a handover request acknowledgment (handover request ACK) message or a conditional handover request acknowledgment (CHO ACK) message, may be another existing Xn or X2 message, or may be a newly defined Xn or X2 message. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the eighth message to the first network device, refer to the foregoing manner in which the second network device sends the second message to the first network device. Details are not described herein again.

In an implementation scenario of this embodiment of this application, when the first information is as described in the case 1, the case 2, or the case 3, the eighth message may include the configuration information corresponding to the second candidate cell, or the information used to update the configuration information corresponding to the first candidate cell. In this case, the second network device may send tenth indication information to the first network device, where the tenth indication information is used to indicate that the eighth message includes the configuration information corresponding to the second candidate cell (that is, full configuration information corresponding to a candidate cell, where the candidate cell is at least one cell that is managed by the second network device), or the tenth indication information is used to indicate that the eighth message carries the information used to update the configuration information corresponding to the first candidate cell (that is, delta configuration information corresponding to a candidate cell, where the candidate cell is at least one cell that is managed by the second network device). Alternatively, the second network device may not send tenth indication information to the first network device. As agreed in a protocol, the eighth message carries the configuration information corresponding to the second candidate cell (that is, full configuration information corresponding to a candidate cell, where the candidate cell is at least one cell that is managed by the second network device), or the eighth message carries the information used to update the configuration information corresponding to the first candidate cell (that is, delta configuration information corresponding to a candidate cell, where the candidate cell is at least one cell that is managed by the second network device). This is not specifically limited in this embodiment of this application.

The tenth indication information may be included in the eighth message, or may be included in another message. For a representation form of the tenth indication information, refer to related descriptions of the representation form of the first indication information. Details are not described herein again.

Optionally, when the first network device is a first CU and the second network device is a second CU, or when the first network device includes a first CU and a first DU and the second network device includes a second CU and a second DU, for a manner in which the second network device sends the tenth indication information to the first network device, refer to the foregoing manner in which the second network device sends the third indication information to the first network device. Details are not described herein again.

In another implementation scenario of this embodiment of this application, when the first information is as described in the case 3, the second network device may send eleventh indication information to the first network device. The eleventh indication information is used to indicate that the handover preparation is completed or that the second network device has completed reconfiguration of a candidate cell (where the candidate cell is managed by the second network device). For a representation form of the eleventh indication information, refer to related descriptions of the representation form of the first indication information. Details are not described herein again.

Optionally, when the first network device is a first CU and the second network device is a second CU, or when the first network device includes a first CU and a first DU and the second network device includes a second CU and a second DU, for a manner in which the second network device sends the eleventh indication information to the first network device, refer to the foregoing manner in which the second network device sends the third indication information to the first network device. Details are not described herein again.

In still another implementation scenario of this embodiment of this application, when the first information is as described in the case 3, the second network device may not send the eighth message to the first network device. For details, refer to related descriptions in step S404b.

Based on this solution, because the first network device can determine the first information, the first network device may first notify the second network device to release the configuration information corresponding to the at least one cell in the first candidate cell, and then send the first information to the second network device. Correspondingly, the second network device may first release the configuration information corresponding to the at least one cell in the first candidate cell, and then update, based on the first information sent by the first network device, the configuration information corresponding to the first candidate cell. Therefore, the network device side can update configuration information corresponding to a candidate cell. According to updating configuration information corresponding to a candidate cell in a timely and proper manner, flexibility and reliability of a conditional handover mechanism are thereby improved Optionally, the information update method provided in this embodiment of this application further includes the following step S507:

S507. The first network device sends, to the terminal device, the configuration information corresponding to the second candidate cell or the information used to update the configuration information corresponding to the first candidate cell.

Optionally, when the first network device is a first CU, step S507 may be: The first CU sends, to the terminal device, the configuration information corresponding to the second candidate cell or the information used to update the configuration information corresponding to the first candidate cell. When the first network device includes a first CU and a first DU, that the first network device sends, to the terminal device, the configuration information corresponding to the second candidate cell or the information used to update the configuration information corresponding to the first candidate cell may be: The first DU sends, to the terminal device, the configuration information corresponding to the second candidate cell or the information used to update the configuration information corresponding to the first candidate cell.

Optionally, the first network device may send a ninth message to the terminal device, where the ninth message includes (or carries) the configuration information corresponding to the second candidate cell or the information used to update the configuration information corresponding to the first candidate cell. For example, the ninth message may be an RRC reconfiguration message, or may be another message. This is not specifically limited in this embodiment of this application.

Optionally, when the first network device is a first CU, that the first network device sends the ninth message to the terminal device may be that the first CU sends a message 6 to the terminal device, where the message 6 may include the configuration information corresponding to the second candidate cell or the information used to update the configuration information corresponding to the first candidate cell. The message 6 may be an existing RRC message, or may be another message. This is not specifically limited in this embodiment of this application. When the first network device includes a first CU and a first DU, that the first network device sends the ninth message to the terminal device may be that the first DU sends the message 6 to the terminal device.

Optionally, the first network device may further send, to the terminal device, a handover execution condition corresponding to the second candidate cell, configuration information corresponding to a candidate cell that is managed by another network device, and/or a handover execution condition corresponding to a candidate cell that is managed by another network device. For related descriptions, refer to the foregoing step S405. Details are not described herein again.

Based on this solution, configuration information corresponding to a candidate cell that is updated on the network device side may be sent to the terminal device in a timely manner, so that the terminal device can reconfigure/update configuration information corresponding to a candidate cell in a timely manner.

It should be noted that, in the information update method shown in FIG. 4 or FIG. 5, it is assumed that update of the configuration information corresponding to the source cell (for example, change of bearer configuration information corresponding to the source cell) may affect configuration information corresponding to a candidate cell (where the candidate cell is one or more cells that are managed by the second network device) (for example, bearer configuration information corresponding to the candidate cell). Therefore, the second network device needs to update, based on newest configuration information corresponding to the source cell, the configuration information corresponding to the first candidate cell (or reconfigure configuration information corresponding to a candidate cell that is managed by the second network device). The change of the bearer configuration information corresponding to the source cell may be one or more of the following: The first network device adds or releases one or more data radio bearers (DRB) corresponding to the source cell; the first network device adds or releases one or more PDU sessions corresponding to the source cell; or the first network device adds or releases one or more evolved packet system (EPS) bearers corresponding to the source cell.

It may be understood that when the configuration information corresponding to the source cell is updated, if the update does not affect the configuration information corresponding to the first candidate cell, the first network device may still send the first information to the second network device. Correspondingly, after the second network device receives the first information, the second network device may still update, based on the information update method shown in FIG. 4 or FIG. 5, the configuration information corresponding to the first candidate cell (or reconfigure configuration information corresponding to a candidate cell that is managed by the second network device), to obtain the configuration information corresponding to the second candidate cell. Alternatively, optionally, if the update does not affect the configuration information corresponding to the first candidate cell, the first network device does not need to notify the second network device to reconfigure configuration information corresponding to a candidate cell (where the candidate cell is one or more cells that are managed by the second network device), and correspondingly, the second network device does not need to update the configuration information corresponding to the first candidate cell (or does not need to reconfigure configuration information corresponding to a configured candidate cell (for example, the first candidate cell) that is managed by the second network device).

For example, if configuration information (such as a physical layer configuration and a measurement configuration) that is unrelated to a core network and that corresponds to the source cell changes, the first network device sends updated configuration information (for example, updated configuration information that is unrelated to the core network, such as an updated physical layer configuration and an updated measurement configuration) corresponding to the source cell to the terminal device. Optionally, the first network device further sends the updated configuration information corresponding to the source cell (for example, the updated configuration information unrelated to the core network, for example, the updated physical layer configuration and the updated measurement configuration) to the second network device. After receiving the updated configuration information corresponding to the source cell, the second network device may save/store the updated configuration information corresponding to the source cell, but the second network device does not need to update the configuration information corresponding to the first candidate cell (or does not need to reconfigure configuration information corresponding to a configured candidate cell (for example, the first candidate cell) that is managed by the second network device). In other words, the first network device and the second network device do not exchange updated configuration information corresponding to a candidate cell. Subsequently, when the second network device expects to update/reconfigure a candidate cell, the second network device may update/reconfigure the candidate cell based on the updated configuration information corresponding to the source cell (that is, latest configuration information that corresponds to the source cell and that is saved/stored by the second network device).

For example, in an implementation scenario of this embodiment of the present invention, the first network device sends a handover request message to the second network device, where the handover request message may include the second configuration information corresponding to the source cell. After receiving the handover request message, the second network device performs admission control, prepares for the CHO procedure, and so on based on the handover request message, for example, determines, based on the second configuration information corresponding to the source cell, the configuration information corresponding to the first candidate cell. Then, the second network device may reply with a handover request acknowledgment message to the first network device. The handover request acknowledgment message may include the configuration information corresponding to the first candidate cell. After receiving the handover request acknowledgment message of the second network device, the first network device sends the configuration information corresponding to the first candidate cell to the terminal device. Correspondingly, the terminal device may parse and save the configuration information corresponding to the first candidate cell.

That the second network device determines, based on the second configuration information corresponding to the source cell, the configuration information corresponding to the first candidate cell may be understood as follows: The configuration information corresponding to the first candidate cell is determined based on the second configuration information corresponding to the source cell, and is a changed part relative to the second configuration information corresponding to the source cell. For example, the second configuration information corresponding to the source cell is bearer configuration information 1, and the configuration information corresponding to the first candidate cell may be bearer configuration information 2. In this case, full configuration information corresponding to the first candidate cell may be obtained based on the bearer configuration information 1 and the bearer configuration information 2. That is, in this scenario, the configuration information corresponding to the first candidate cell may be understood as delta configuration information relative to the second configuration information corresponding to the source cell.

When or after the first network device sends the configuration information corresponding to the first candidate cell to the terminal device, if the second configuration information corresponding to the source cell is updated, but the update does not affect the full configuration information corresponding to the first candidate cell, optionally, the first network device may send the first configuration information corresponding to the source cell (where the first configuration information corresponding to the source cell is obtained by updating the second configuration information corresponding to the source cell) to the second network device. The second network device does not need to update the configuration information corresponding to the first candidate cell (or does not need to reconfigure configuration information corresponding to a configured candidate cell (for example, the first candidate cell) that is managed by the second network device), or the second network device does not need to update the full configuration information corresponding to the first candidate cell (or does not need to reconfigure full configuration information corresponding to a configured candidate cell (for example, the first candidate cell) that is managed by the second network device).

In addition, optionally, the first network device may further send the first configuration information corresponding to the source cell to the terminal device. After receiving the first configuration information corresponding to the source cell, the terminal device may parse and save the first configuration information corresponding to the source cell, and subsequently communicate with the source cell by using the first configuration information corresponding to the source cell.

In addition, the terminal device may determine, based on the second configuration information corresponding to the source cell and the configuration information corresponding to the first candidate cell, whether the first candidate cell meets a CHO execution condition, and determine a cell that is in the first candidate cell and that meets the CHO execution condition as a target cell. Then, the terminal device may attempt to access the target cell (for example, perform a random access procedure with the target cell), and perform data communication with the target cell after successfully accessing the target cell.

Figure 6:
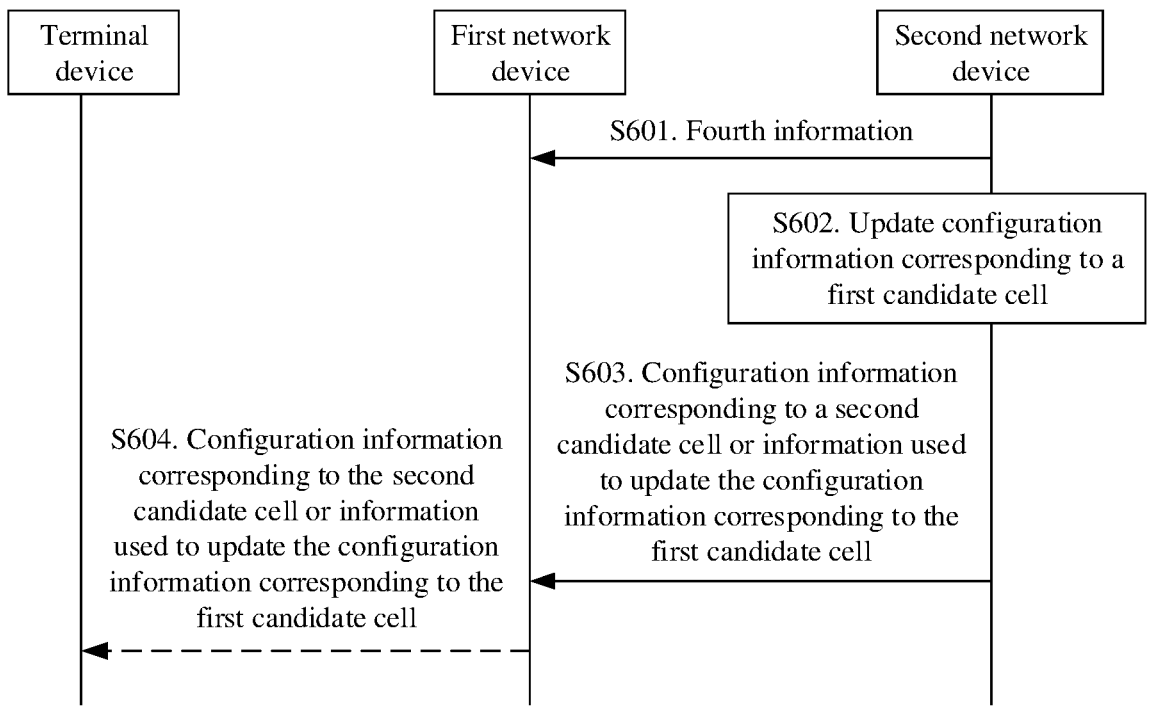
FIG. 6 is a schematic flowchart of still another information update method according to an embodiment of this application.

Before attempting to access the target cell, the terminal device may determine, based on the second configuration information corresponding to the source cell and the configuration information corresponding to the first candidate cell, configuration information corresponding to the target cell (where the configuration information corresponding to the target cell herein is full configuration information corresponding to the target cell). Subsequently, when attempting to access the target cell and performing data communication with the target cell after successfully accessing the target cell, the terminal device may use the configuration information corresponding to the target cell that is determined based on the second configuration information corresponding to the source cell and the configuration information corresponding to the first candidate cell. For example, after successfully accessing the target cell, the terminal device sends an RRC reconfiguration complete message to the target cell by using the configuration information corresponding to the target cell that is determined based on the second configuration information corresponding to the source cell and the configuration information corresponding to the first candidate cell. FIG. 6 shows still another information update method according to an embodiment of this application. The information update method is applicable to a scenario in which a second network device initiates update of configuration information corresponding to a candidate cell. The information update method includes the following steps.

S601. The second network device sends fourth information to a first network device. Correspondingly, the first network device receives the fourth information from the second network device.

The fourth information is used to indicate to release configuration information corresponding to at least one cell in a first candidate cell, Optionally, when the first network device is a first CU and the second network device is a second CU, or when the first network device includes a first CU and a first DU and the second network device includes a second CU and a second DU, for a manner in which the second network device sends the fourth information to the first network device, refer to the foregoing manner in which the second network device sends the second information to the first network device. Details are not described herein again.

Optionally, the second network device may send a tenth message to the first network device, where the tenth message includes (or carries) the fourth information. For example, the tenth message may be a conditional handover cancel (CHO cancel) message or a handover cancel (HO cancel) message, may be another existing Xn or X2 message, or may be a newly defined Xn or X2 message. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the tenth message to the first network device, refer to the foregoing manner in which the second network device sends the second message to the first network device. Details are not described herein again.

Optionally, the fourth information may include identification information of at least one cell that is in the first candidate cell and that needs to be released. For example, the identification information includes at least one of a PCI, frequency information, or a CGI.

Optionally, the second network device may send cause value information to the first network device. For example, the cause value information is used to indicate a cause for releasing the configuration information corresponding to the at least one cell in the first candidate cell. Specifically, for example, the cause value information may be "the second network device initiates update of configuration information corresponding to a candidate cell", or the cause value information may have another representation form. This is not limited in this embodiment.

Optionally, after receiving the fourth information from the second network device, the first network device may send the fourth information to a terminal device, so that the terminal device also releases the configuration information corresponding to the at least one cell in the first candidate cell, thereby avoiding a handover failure or another error caused by inconsistent understanding by the second network device and the terminal device.

Optionally, when the first network device is a first CU, that the first network device sends the fourth information to the terminal device may be that the first CU sends the fourth information to the terminal device. When the first network device includes a first CU and a first DU, that the first network device sends the fourth information to the terminal device may be that the first DU sends the fourth information to the terminal device.

S602. The second network device updates configuration information corresponding to the first candidate cell to obtain configuration information corresponding to a second candidate cell.

That the second network device updates the configuration information corresponding to the first candidate cell may also be understood as follows: The second network device reconfigures a candidate cell to obtain the configuration information corresponding to the second candidate cell. For details, refer to related descriptions in step S403. Details are not described herein again.

Optionally, in step S602, the second network device may update, based on configuration information corresponding to a source cell (which may be second configuration information corresponding to the source cell or first configuration information corresponding to the source cell), the configuration information corresponding to the first candidate cell (or reconfigure configuration information corresponding to a candidate cell) or may update, based on another configuration of the second network device, the configuration information corresponding to the first candidate cell (or reconfigure configuration information corresponding to a candidate cell). This is not specifically limited in this embodiment of this application.

Optionally, when the second network device is a second CU or when the second network device includes a second CU and a second DU, "the second network device updates the configuration information corresponding to the first candidate cell to obtain the configuration information corresponding to the second candidate cell" may mean "the second CU and/or the second DU update/updates the configuration information corresponding to the first candidate cell to obtain the configuration information corresponding to the second candidate cell".

Correspondingly, that the second network device reconfigures a candidate cell based on the first information to obtain the configuration information corresponding to the second candidate cell may be "the second CU and/or the second DU reconfigure/reconfigures the candidate cell based on the first information to obtain the configuration information corresponding to the second candidate cell".

S603. The second network device sends, to the first network device, the configuration information corresponding to the second candidate cell or information used to update the configuration information corresponding to the first candidate cell.

Optionally, when the first network device is a first CU and the second network device is a second CU, or when the first network device includes a first CU and a first DU and the second network device includes a second CU and a second DU, for a manner in which the second network device sends, to the first network device, the configuration information corresponding to the second candidate cell or the information used to update the configuration information corresponding to the first candidate cell, refer to the foregoing manner in which the second network device sends the second information to the first network device. Details are not described herein again.

Optionally, the second network device may send an eleventh message to the first network device, where the eleventh message includes (or carries) the configuration information corresponding to the second candidate cell or the information used to update the configuration information corresponding to the first candidate cell. Optionally, the eleventh message may be, for example, a handover request (HO request) acknowledgment message or a conditional handover request acknowledgment (CHO ACK) message, may be another existing Xn or X2 message, or may be a newly defined Xn or X2 message. This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the eleventh message to the first network device, refer to the foregoing manner in which the second network device sends the second message to the first network device. Details are not described herein again.

Optionally, the second network device may further send twelfth indication information to the first network device. The twelfth indication information is used to indicate that the second network device sends, to the first network device, the configuration information corresponding to the second candidate cell (that is, full configuration information corresponding to a candidate cell), or the twelfth indication information is used to indicate that the second network device sends, to the first network device, the information used to update the configuration information corresponding to the first candidate cell (that is, delta configuration information corresponding to a candidate cell). Alternatively, the second network device may not send twelfth indication information to the first network device. As agreed in a protocol, the second network device sends, to the first network device, the configuration information corresponding to the second candidate cell (that is, full configuration information corresponding to a candidate cell), or the second network device sends, to the first network device, the information used to update the configuration information corresponding to the first candidate cell (that is, delta configuration information corresponding to a candidate cell). This is not specifically limited in this embodiment of this application.

Optionally, when the first network device is a first CU and the second network device is a second CU, or when the first network device includes a first CU and a first DU and the second network device includes a second CU and a second DU, for a manner in which the second network device sends the twelfth indication information to the first network device, refer to the foregoing manner in which the second network device sends the third indication information to the first network device. Details are not described herein again.

The twelfth indication information may be included in the eleventh message, or may be included in another message. This is not specifically limited in this embodiment of this application. For a representation form of the twelfth indication information, refer to related descriptions of the representation form of the first indication information. Details are not described herein again.

Based on this solution, the second network device may first notify the first network device to release the configuration information corresponding to the at least one cell in the first candidate cell, and then send, to the first network device, the configuration information corresponding to the second candidate cell or the information used to update the configuration information corresponding to the first candidate cell. Correspondingly, the first network device may first release the configuration information corresponding to the at least one cell in the first candidate cell, and then receive, from the second network device, the configuration information corresponding to the second candidate cell or the information used to update the configuration information corresponding to the first candidate cell. Therefore, a network device side can update configuration information corresponding to a candidate cell. According to updating configuration information corresponding to a candidate cell in a timely and proper manner, flexibility and reliability of a conditional handover mechanism are thereby improved.

Optionally, the information update method provided in this embodiment of this application further includes the following step S604:

S604. The first network device sends, to the terminal device, the configuration information corresponding to the second candidate cell or the information used to update the configuration information corresponding to the first candidate cell.

Optionally, when the first network device is a first CU, step S604 may be: The first CU sends, to the terminal device, the configuration information corresponding to the second candidate cell or the information used to update the configuration information corresponding to the first candidate cell. When the first network device includes a first CU and a first DU, that the first network device sends, to the terminal device, the configuration information corresponding to the second candidate cell or the information used to update the configuration information corresponding to the first candidate cell may be: The first DU sends, to the terminal device, the configuration information corresponding to the second candidate cell or the information used to update the configuration information corresponding to the first candidate cell.

Optionally, the first network device may send a twelfth message to the terminal device, where the twelfth message includes (or carries) the configuration information corresponding to the second candidate cell or the information used to update the configuration information corresponding to the first candidate cell. For example, the twelfth message may be an RRC reconfiguration message, or may be another message. This is not specifically limited in this embodiment of this application.

Optionally, when the first network device is a first CU, that the first network device sends the twelfth message to the terminal device may be that the first CU sends a message 7 to the terminal device, where the message 7 may include the configuration information corresponding to the second candidate cell or the information used to update the configuration information corresponding to the first candidate cell. The message 7 may be an existing RRC message, or may be another message. This is not specifically limited in this embodiment of this application. When the first network device includes a first CU and a first DU, that the first network device sends the twelfth message to the terminal device may be that the first DU sends the message 7 to the terminal device.

Optionally, the first network device may further send, to the terminal device, a handover execution condition corresponding to the second candidate cell, configuration information corresponding to a candidate cell that is managed by another network device, and/or a handover execution condition corresponding to a candidate cell that is managed by another network device. For related descriptions, refer to the foregoing step S405. Details are not described herein again.

Based on this solution, configuration information corresponding to a candidate cell that is updated on the network device side may be sent to the terminal device in a timely manner, so that the terminal device can reconfigure/update configuration information corresponding to a candidate cell in a timely manner.

An embodiment of this application further provides an information update method, which is applicable to a scenario in which a second network device initiates update of configuration information corresponding to a candidate cell. In the information update method, the second network device sends, to a first network device, configuration information corresponding to a reconfigured candidate cell (that is, full configuration information corresponding to the reconfigured candidate cell). The candidate cell is one or more cells that are managed by the second network device, and may include a candidate cell that has been configured before, for example, a first candidate cell, and/or a candidate cell that has not been configured before.

For example, when the second network device triggers update of configuration information corresponding to the first candidate cell (or the second network device triggers reconfiguration of a candidate cell), the second network device may update, based on second configuration information corresponding to a source cell or first configuration information corresponding to the source cell (where the first network device may update the second configuration information corresponding to the source cell to obtain the first configuration information corresponding to the source cell, and send the first configuration information to the second network device), the configuration information corresponding to the first candidate cell (or reconfigure the candidate cell) to obtain configuration information (namely, full configuration information) corresponding to a second candidate cell, and send the configuration information (namely, the full configuration information) corresponding to the second candidate cell to the first network device.

After receiving the configuration information corresponding to the second candidate cell, the first network device sends the configuration information corresponding to the second candidate cell to a terminal device. Alternatively, the first network device processes the configuration information corresponding to the second candidate cell, based on latest configuration information corresponding to the source cell (where for example, the first network device updates the second configuration information corresponding to the source cell to obtain the first configuration information corresponding to the source cell, and the latest configuration information corresponding to the source cell herein is the first configuration information corresponding to the source cell). For example, the first network device obtains, based on the configuration information corresponding to the second candidate cell and the first configuration information corresponding to the source cell, information used by a terminal device to generate the configuration information corresponding to the second candidate cell. Then the first network device sends, to the terminal device, the information used by the terminal device to generate the configuration information corresponding to the second candidate cell, so that the terminal device obtains, based on the information used by the terminal device to generate the configuration information corresponding to the second candidate cell and the first configuration information corresponding to the source cell, the configuration information corresponding to the second candidate cell.

Alternatively, the first network device processes, based on the second configuration information corresponding to the source cell, the configuration information corresponding to the second candidate cell. For example, the first network device obtains, based on the configuration information corresponding to the second candidate cell and the second configuration information corresponding to the source cell, information used by a terminal device to generate the configuration information corresponding to the second candidate cell. Then the first network device sends, to the terminal device, the information used by the terminal device to generate the configuration information corresponding to the second candidate cell, so that the terminal device obtains, based on the information used by the terminal device to generate the configuration information corresponding to the second candidate cell and the second configuration information corresponding to the source cell, the configuration information corresponding to the second candidate cell.

Based on this solution, the second network device may send, to the first network device, configuration information that corresponds to a candidate cell and that is updated by the second network device. Therefore, a network device side can update configuration information corresponding to a candidate cell. According to updating configuration information corresponding to a candidate cell in a timely and proper manner, flexibility and reliability of a conditional handover mechanism are thereby improved.

It may be understood that, in embodiments of this application, interaction between the network device and the terminal device is also applicable to interaction between the CU and the terminal device or interaction between the DU and the terminal device. It may be understood that, in embodiments of this application, a mechanism of interaction between the network device and the terminal device may be appropriately transformed, to be applicable to interaction between the CU or the DU and the terminal device.

It may be understood that, in embodiments of this application, the first network device and/or the second network device may perform some or all steps in embodiments of this application. These steps or operations are merely examples. In embodiments of this application, other operations or variations of various operations may be further performed. In addition, the steps may be performed in a sequence different from the sequence presented in this embodiment of this application, and not all operations in embodiments of this application may be performed.

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

It may be understood that, in the foregoing embodiments, the methods and/or steps implemented by a network device (including the first network device and the second network device) may alternatively be implemented by a component (for example, a chip or a circuit) that can be used in the network device.

The foregoing mainly describes the solutions provided in embodiments of this application from a perspective of interaction between network elements. Correspondingly, an embodiment of this application further provides a communication apparatus. The communication apparatus is configured to implement the foregoing methods. The communication apparatus may be the first network device in the foregoing method embodiments, an apparatus including the first network device, or a component that can be used in the first network device. Alternatively, the communication apparatus may be the second network device in the foregoing method embodiments, an apparatus including the second network device, or a component that may be used in the second network device. It may be understood that, to implement the foregoing functions, the communication apparatus includes corresponding hardware structures and/or software modules for performing the functions. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in embodiments of this application, division into the modules is an example and is merely logical function division, and may be other division in an actual implementation.

Figure 7:
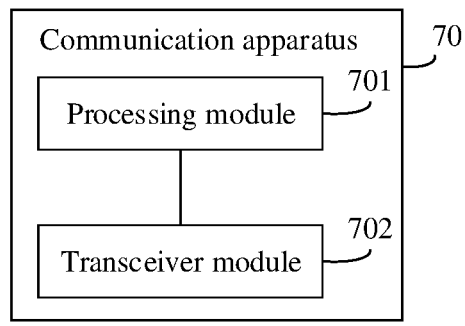
FIG. 7 is a schematic diagram of a structure of a communication apparatus according to an embodiment of this application.

For example, the communication apparatus implements the steps of the second network device in the foregoing method embodiments. FIG. 7 is a schematic diagram of a structure of a communication apparatus 70. The communication apparatus 70 includes a processing module 701 and a transceiver module 702. The transceiver module 702 may also be referred to as a transceiver unit, configured to implement a sending and/or receiving function. For example, the transceiver module 702 may be a transceiver circuit, a transceiver machine, a transceiver, or a communication interface.

The transceiver module 702 may include a receiving module and a sending module, which are respectively configured to perform receiving and sending steps performed by the second network device in the foregoing method embodiments. The processing module 701 may be configured to perform steps other than the receiving and sending steps performed by the second network device in the foregoing method embodiments.

The transceiver module 702 is configured to receive first information from a first network device. The processing module 701 is configured to update, based on the first information, configuration information corresponding to a first candidate cell to obtain configuration information corresponding to a second candidate cell, where both the first candidate cell and the second candidate cell are managed by the second network device, the first candidate cell includes at least one cell, and the second candidate cell includes at least one cell.

Optionally, the transceiver module 702 is further configured to send, to the first network device, configuration information corresponding to the second candidate cell or information used to update the configuration information corresponding to the first candidate cell.

Optionally, when the first information includes first configuration information corresponding to a source cell, the processing module 701 is specifically configured to update, based on the first configuration information corresponding to the source cell, the configuration information corresponding to the first candidate cell.

Optionally, when the first information includes the information used to update second configuration information corresponding to a source cell, the processing module 701 is specifically configured to: update, based on the information used to update the second configuration information corresponding to the source cell, the second configuration information corresponding to the source cell to obtain first configuration information corresponding to the source cell; and update, based on the first configuration information corresponding to the source cell, the configuration information corresponding to the first candidate cell.

Optionally, when the first information is used to indicate that the second configuration information corresponding to the source cell is not updated, the processing module 701 is specifically configured to update, based on the second configuration information corresponding to the source cell, the configuration information corresponding to the first candidate cell.

Optionally, the transceiver module 702 is further configured to send second information to the first network device, where the second information is used to request configuration information corresponding to the source cell at a current moment.

Optionally, the transceiver module 702 is further configured to receive third information from the first network device. The processing module 701 is further configured to release, based on the third information, configuration information corresponding to the at least one cell in the first candidate cell.

Optionally, that the processing module 701 is configured to update the configuration information corresponding to the first candidate cell includes: The processing module 701 is configured to modify configuration information corresponding to a first cell, release configuration information corresponding to a second cell, or add configuration information corresponding to a third cell.

All related content of the steps in the foregoing method embodiments may be cited in function descriptions of corresponding function modules. Details are not described herein again.

Optionally, the communication apparatus 70 may further include a storage module (not shown in FIG. 7), configured to store data and/or instructions. The processing module 701 may read the data or the instructions in the storage module, to implement the methods corresponding to the foregoing embodiments.

It may be understood that the foregoing modules may be independently disposed, or may be integrated. This is not limited in this embodiment of this application.

In a possible implementation, the communication apparatus 70 is presented in an integrated form of function modules obtained through division. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the communication apparatus 70 may be in a form of the second network device shown in FIG. 3.

For example, the processor 301 in the second network device shown in FIG. 3 may invoke the computer-executable instructions stored in the memory 302, to enable the communication apparatus 70 to perform the information update method according to the foregoing method embodiments.

Specifically, the processor 301 in the second network device shown in FIG. 3 may invoke the computer-executable instructions stored in the memory 302, to implement functions/implementation processes of the processing module 701 and the transceiver module 702 in FIG. 7. Alternatively, the processor 301 in the second network device shown in FIG. 3 may invoke the computer-executable instructions stored in the memory 302, to implement functions/implementation processes of the processing module 701 in FIG. 7, and the transceiver 303 in the second network device shown in FIG. 3 may implement functions/implementation processes of the transceiver module 702 in FIG. 7.

Because the communication apparatus 70 provided in this embodiment may perform the foregoing information update method, for technical effects that can be achieved by the communication apparatus 70, refer to the foregoing method embodiments. Details are not described herein again.

It should be noted that, in this embodiment of this application, related descriptions in which the processing module 701 updates the configuration information corresponding to the first candidate cell may be correspondingly replaced with that the processing module 701 reconfigures a candidate cell.

Figure 8:
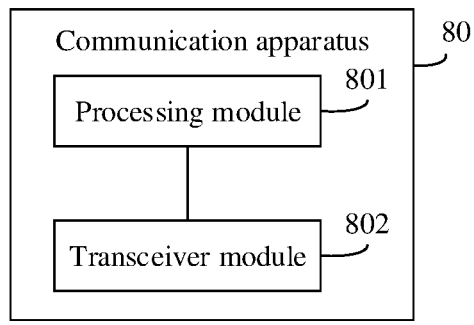
FIG. 8 is a schematic diagram of a structure of another communication apparatus according to an embodiment of this application.

Alternatively, for example, the communication apparatus implements the steps of the first network device in the foregoing method embodiments. FIG. 8 is a schematic diagram of a structure of a communication apparatus 80. The communication apparatus 80 includes a processing module 801 and a transceiver module 802. The transceiver module 802 may also be referred to as a transceiver unit, configured to implement a sending and/or receiving function. For example, the transceiver module 802 may be a transceiver circuit, a transceiver machine, a transceiver, or a communication interface.

The transceiver module 802 may include a receiving module and a sending module, which are respectively configured to perform receiving and sending steps performed by the first network device in the foregoing method embodiments. The processing module 801 may be configured to perform steps other than the receiving and sending steps performed by the first network device in the foregoing method embodiments.

The processing module 801 is configured to determine first information. The transceiver module 802 is configured to send the first information to a second network device, where the first information is used to update configuration information corresponding to a first candidate cell to obtain configuration information corresponding to a second candidate cell, both the first candidate cell and the second candidate cell are managed by the second network device, the first candidate cell includes at least one cell, and the second candidate cell includes at least one cell.

Optionally, the transceiver module 802 is further configured to receive, from the second network device, the configuration information corresponding to the second candidate cell or information used to update the configuration information corresponding to the first candidate cell.

Optionally, before sending the first information to the second network device, the transceiver module 802 is further configured to receive second information from the second network device. The second information is used to request configuration information corresponding to a source cell at a current moment.

Optionally, before receiving the first information from the first network device, the transceiver module 802 is further configured to receive third information from the first network device. The processing module 801 is further configured to release, based on the third information, configuration information corresponding to the at least one cell in the first candidate cell.

All related content of the steps in the foregoing method embodiments may be cited in function descriptions of corresponding function modules. Details are not described herein again.

Optionally, the communication apparatus 80 may further include a storage module (not shown in FIG. 8), configured to store data and/or instructions. The processing module 801 may read the data or the instructions in the storage module, to implement the methods corresponding to the foregoing embodiments.

It may be understood that the foregoing modules may be independently disposed, or may be integrated. This is not limited in this embodiment of this application.

In a possible implementation, the communication apparatus 80 is presented in an integrated form of function modules obtained through division. The "module" herein may be a specific ASIC, a circuit, a processor executing one or more software or firmware programs, a memory, an integrated logic circuit, and/or another component that can provide the foregoing function. In a simple embodiment, a person skilled in the art may figure out that the communication apparatus 80 may be in a form of the first network device shown in FIG. 3.

For example, the processor 201 in the network device shown in FIG. 3 may invoke the computer-executable instructions stored in the memory 202, to enable the communication apparatus 80 to perform the information update method according to the foregoing method embodiments.

Specifically, the processor 201 in the first network device shown in FIG. 3 may invoke the computer-executable instructions stored in the memory 202, to implement functions/implementation processes of the processing module 801 and the transceiver module 802 in FIG. 8. Alternatively, the processor 201 in the first network device shown in FIG. 3 may invoke the computer-executable instructions stored in the memory 202, to implement functions/implementation processes of the processing module 801 in FIG. 8, and the transceiver 203 in the first network device shown in FIG. 3 may implement functions/implementation processes of the transceiver module 802 in FIG. 8.

Because the communication apparatus 80 provided in this embodiment may perform the foregoing information update method, for technical effects that can be achieved by the communication apparatus 80, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. In another possible design, the communication apparatus further includes an interface circuit. The interface circuit is a code/data read/write interface circuit, and the interface circuit is configured to: receive computer-executable instructions (where the computer-executable instructions are stored in a memory, may be directly read from the memory, or may be read by using another component), and transmit the computer-executable instructions to the processor. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD)), or the like. In embodiments of this application, the computer may include the foregoing apparatuses.

Although this application is described with reference to embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A method, comprising:
   receiving, by a second network device, first information from a first network device serving a terminal device; and
   updating, by the second network device based on the first information, configuration information configured for handover of the terminal device, to obtain updated configuration information for the handover, the configuration information corresponding to a first candidate cell and the updated configuration information corresponding to a second candidate cell, wherein both the first candidate cell and the second candidate cell are managed by the second network device, the first candidate cell comprises at least one cell, and the second candidate cell comprises at least one cell; and
   wherein the updating the configuration information comprises:
      modifying, by the second network device, configuration information corresponding to a first cell, releasing, by the second network device, configuration information corresponding to a second cell, or adding, by the second network device, configuration information corresponding to a third cell; and
      wherein the first cell is at least one cell in the first candidate cell, the second cell is at least one cell in the first candidate cell, the third cell is at least one cell in the second candidate cell, and the third cell is not comprised in the first candidate cell.

2. The method according to claim 1, wherein the method further comprises:
   sending, by the second network device to the first network device, the updated configuration information corresponding to the second candidate cell or information used to update the configuration information corresponding to the first candidate cell.

3. The method according to claim 2, wherein the first information indicates first configuration information corresponding to a source cell of the terminal device, and the source cell is managed by the first network device.

4. The method according to claim 3, wherein the first information comprises the first configuration information corresponding to the source cell; and
   the updating, by the second network device based on the first information, the configuration information comprises:
      updating, by the second network device based on the first configuration information corresponding to the source cell, the configuration information corresponding to the first candidate cell.

5. The method according to claim 3, wherein the first information comprises information used to generate the first configuration information corresponding to the source cell; and
   the updating, by the second network device based on the first information, the configuration information comprises:
      updating, by the second network device based on the information used to generate the first configuration information corresponding to the source cell, second configuration information corresponding to the source cell, to obtain the first configuration information corresponding to the source cell; and
      updating, by the second network device based on the first configuration information corresponding to the source cell, the configuration information corresponding to the first candidate cell.

6. The method according to claim 1, further comprising:
   sending, by the second network device, second information to the first network device, wherein the second information indicates the first network device to determine whether to modify a configuration corresponding to a source cell of the terminal device, and the source cell is managed by the first network device.

7. A communications apparatus, comprising a processor and a non-transitory memory; and
   the memory stores computer-executable instructions; and
   when the processor executes the computer-executable instructions, the communication apparatus is caused to perform following:
      receiving first information from a first network device serving a terminal device; and
      updating, based on the first information, configuration information configured for handover of the terminal device, to obtain updated configuration information for the handover, the configuration information corresponding to a first candidate cell and the updated configuration information corresponding to a second candidate cell, wherein both the first candidate cell and the second candidate cell are managed by the communication apparatus, the first candidate cell comprises at least one cell, and the second candidate cell comprises at least one cell; and wherein the updating the configuration information comprises:
modifying configuration information corresponding to a first cell, releasing configuration information corresponding to a second cell, or adding configuration information corresponding to a third cell, wherein
the first cell is at least one cell in the first candidate cell, the second cell is at least one cell in the first candidate cell, the third cell is at least one cell in the second candidate cell, and the third cell is not comprised in the first candidate cell.

8. The apparatus according to claim 7, wherein the instructions, when executed by the processor, further cause the communications apparatus to:
send, to the first network device, the updated configuration information corresponding to the second candidate cell or information used to update the configuration information corresponding to the first candidate cell.

9. The apparatus according to claim 8, wherein the first information indicates first configuration information corresponding to a source cell of the terminal device, and the source cell is managed by the first network device.

10. The apparatus according to claim 9, wherein the first information comprises the first configuration information corresponding to the source cell; and
the updating, based on the first information, the configuration information comprises:
updating, based on the first configuration information corresponding to the source cell, the configuration information corresponding to the first candidate cell.

11. The apparatus according to claim 9, wherein the first information comprises information used to generate the first configuration information corresponding to the source cell; and
the updating, based on the first information, the configuration information comprises:
updating, based on the information used to generate the first configuration information corresponding to the source cell, second configuration information corresponding to the source cell, to obtain the first configuration information corresponding to the source cell; and
updating, based on the first configuration information corresponding to the source cell, the configuration information corresponding to the first candidate cell.

12. The apparatus according to claim 7, wherein the instructions, when executed by the processor, further cause the communications apparatus to:
send second information to the first network device, wherein the second information indicates the first network device to determine whether to modify a configuration corresponding to a source cell of the terminal device, and the source cell is managed by the first network device.

13. A communications apparatus, comprising a processor and a non-transitory memory; and
the memory stores computer-executable instructions; and when the processor executes the computer-executable instructions, the communication apparatus is caused to perform following:
determining first information, wherein the first information is used to update configuration information for handover of a terminal device served by the communications apparatus to obtain updated configuration information for the handover, the configuration information corresponding to a first candidate cell and the updated configuration information corresponding to a second candidate cell, both the first candidate cell and the second candidate cell are managed by a second network device, the first candidate cell comprises at least one cell, and the second candidate cell comprises at least one cell; and
sending the first information to the second network device; and
wherein the updating the configuration information comprises:
modifying configuration information corresponding to a first cell, releasing configuration information corresponding to a second cell, or adding configuration information corresponding to a third cell; and
wherein the first cell is at least one cell in the first candidate cell, the second cell is at least one cell in the first candidate cell, the third cell is at least one cell in the second candidate cell, and the third cell is not comprised in the first candidate cell.

14. The apparatus according to claim 13, wherein the instructions, when executed by the processor, further cause the communications apparatus to:
receive, from the second network device, the updated configuration information corresponding to the second candidate cell or information used to update the configuration information corresponding to the first candidate cell.

15. The apparatus according to claim 13, wherein the first information indicates first configuration information corresponding to a source cell of the terminal device, the first configuration information corresponding to the source cell is obtained by updating second configuration information corresponding to the source cell, and the source cell is managed by a first network device.

16. The apparatus according to claim 13, wherein the instructions, when executed by the processor, further cause the communications apparatus to:
receive second information from the second network device, wherein the second information requests configuration information corresponding to a source cell of the terminal device at a current moment, and the source cell is managed by a first network device.

17. The apparatus according to claim 13, wherein the instructions, when executed by the processor, further cause the communications apparatus to:
send, to the terminal device, the updated configuration information corresponding to the second candidate cell or the first information used to update the configuration information corresponding to the first candidate cell.

18. The apparatus according to claim 17, wherein the instructions, when executed by the processor, further cause the communications apparatus to:
update, based on the first information used to update the configuration information corresponding to the first candidate cell, the configuration information corresponding to the first candidate cell to obtain the updated configuration information corresponding to the second candidate cell.

* * * * *